(12) United States Patent
Frisch et al.

(10) Patent No.: US 8,071,697 B2
(45) Date of Patent: *Dec. 6, 2011

(54) SILICONE ENCAPSULANT COMPOSITION FOR MOLDING SMALL SHAPES

(75) Inventors: Lawrence Frisch, Midland, MI (US); Maneesh Bahadur, Midland, MI (US); Ann Norris, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 867 days.

This patent is subject to a terminal disclaimer.

(21) Appl. No.: 11/885,295

(22) PCT Filed: Mar. 16, 2006

(86) PCT No.: PCT/US2006/010001
§ 371 (c)(1), (2), (4) Date: Aug. 29, 2007

(87) PCT Pub. No.: WO2006/127100
PCT Pub. Date: Nov. 30, 2006

(65) Prior Publication Data
US 2008/0185601 A1   Aug. 7, 2008

Related U.S. Application Data

(60) Provisional application No. 60/684,932, filed on May 26, 2005.

(51) Int. Cl.
*C08G 77/12* (2006.01)

(52) U.S. Cl. ............... 525/478; 528/31; 528/32; 528/43

(58) Field of Classification Search ............ 528/31, 528/33, 34, 38, 15; 524/477–479, 588; 525/477, 525/478; 264/300
See application file for complete search history.

(56) References Cited

U.S. PATENT DOCUMENTS

| | | |
|---|---|---|
| 3,915,924 A | 10/1975 | Wright |
| 3,974,122 A | 8/1976 | Sato et al. |
| 4,085,084 A | 4/1978 | Merrill |
| 4,780,510 A | 10/1988 | Uemiya et al. |
| 5,116,369 A | 5/1992 | Kushibiki et al. |
| 5,127,811 A | 7/1992 | Trethowan |
| 5,233,007 A | 8/1993 | Yang |
| 5,236,970 A | 8/1993 | Christ et al. |
| 5,239,035 A | 8/1993 | Maxson |
| 5,266,352 A | 11/1993 | Filas et al. |
| 5,272,013 A | 12/1993 | Raleigh et al. |
| 5,314,979 A | 5/1994 | Okinoshima et al. |
| 5,376,694 A | 12/1994 | Christ et al. |
| 5,384,383 A | 1/1995 | Legrow et al. |
| 5,420,213 A | 5/1995 | Yang |
| 5,444,106 A | 8/1995 | Zhou et al. |
| 5,494,946 A | 2/1996 | Christ et al. |
| 5,512,609 A | 4/1996 | Yang |
| 5,541,278 A | 7/1996 | Raleigh et al. |
| 5,594,424 A | 1/1997 | Louy et al. |
| 5,623,029 A | 4/1997 | Yang |
| 5,673,995 A | 10/1997 | Segaud |
| 5,739,948 A | 4/1998 | Kushibiki et al. |
| 5,900,456 A * | 5/1999 | Hashiuchi et al. ............ 524/588 |
| 5,955,542 A | 9/1999 | Davis et al. |
| 6,066,172 A | 5/2000 | Huo et al. |
| 6,174,079 B1 | 1/2001 | Buard et al. |
| 6,174,983 B1 | 1/2001 | Czech et al. |
| 6,274,924 B1 | 8/2001 | Carey et al. |
| 6,277,147 B1 | 8/2001 | Christ et al. |
| 6,361,561 B1 | 3/2002 | Huo et al. |
| 6,399,734 B1 | 6/2002 | Hodd et al. |
| 6,483,981 B1 | 11/2002 | Krahn et al. |
| 6,509,423 B1 | 1/2003 | Zhu et al. |
| 6,568,822 B2 | 5/2003 | Boyd et al. |

(Continued)

FOREIGN PATENT DOCUMENTS

DE    100 52 068 A1    5/2002

(Continued)

OTHER PUBLICATIONS

Abstract—JP 01-105418, published Apr. 21, 1989, Bridgestone Corp (applicant).
Norris, A., et. al., "Silicone polymers for optical films and devices," Linear and Nonlinear Optics of Organic Materials II, 2002, pp. 79-86, vol. 4798, SPIE.
Su, Kai, et. al., "Siloxane Materials for Optical Applications," Materials and Nanotechnologies, 2005, pp. 60291C1-60291C8, vol. 6029, SPIE.
Norris, Ann W., et. al., "Novel Silicone Materials for LED Packaging," 2005, pp. 594115-1-594115-7, vol. 5941, SPIE, Bellingham, WA.

*Primary Examiner* — Mathieu D. Vargot
(74) *Attorney, Agent, or Firm* — Erika Takeuchi

(57) ABSTRACT

A process includes the steps of: 1) heating a mold at a temperature ranging from 100° C. to 200° C.; 2) feeding a silicone encapsulant composition including a mold release agent, where the composition has a viscosity ranging from 100 cps to 3,000 cps at operating temperatures of the process, to an assembly for preventing the silicone encapsulant composition from flowing backward out of the assembly; 3) injecting the silicone encapsulant composition from the assembly into a mold having a horizontal orientation and having a mold cavity through a gate, where the mold cavity has a top and a bottom, a vent is located at the top of the mold cavity, the vent comprises a channel 0.1 mm to 1 mm wide by 0.0001 mm to 0.001 mm deep, the gate is located at the bottom of the mold cavity, and injecting is performed at a pressure ranging from 1,000 psi to 10,000 psi for up to 5 seconds; 4) holding the silicone encapsulant composition at 1,000 psi to 10,000 psi for an amount of time sufficient to prevent the silicone encapsulant composition from flowing out of the mold cavity; 5) curing the product of step 4). Lenses for LED packages may be prepared by the process.

4 Claims, 3 Drawing Sheets

U.S. PATENT DOCUMENTS

| | | |
|---|---|---|
| 6,613,343 B2 | 9/2003 | Dillingham et al. |
| 6,645,246 B1 | 11/2003 | Weinschenk et al. |
| 6,727,303 B2 | 4/2004 | Ono et al. |
| 6,737,496 B2 | 5/2004 | Hodd et al. |
| 6,777,522 B2 | 8/2004 | Lai et al. |
| 6,798,792 B2 | 9/2004 | Itoh |
| 6,805,712 B2 | 10/2004 | Lai |
| 6,806,509 B2 | 10/2004 | Yoshino et al. |
| 6,815,520 B2 | 11/2004 | Yoneda et al. |
| 6,844,414 B2 | 1/2005 | Lai et al. |
| 6,864,341 B2 | 3/2005 | Lai et al. |
| 6,864,342 B2 | 3/2005 | Lai et al. |
| 7,625,986 B2 * | 12/2009 | Yoshitake et al. ............ 525/478 |
| 2002/0001320 A1 | 1/2002 | Itoh |
| 2002/0055778 A1 | 5/2002 | Huo et al. |
| 2002/0161140 A1 | 10/2002 | Yoneda et al. |
| 2002/0169505 A1 | 11/2002 | Jethmalani et al. |
| 2003/0130465 A1 | 7/2003 | Lai et al. |
| 2003/0134977 A1 | 7/2003 | Lai et al. |
| 2003/0158309 A1 | 8/2003 | Ono et al. |
| 2003/0162929 A1 | 8/2003 | Lambertine |
| 2003/0234458 A1 | 12/2003 | Gardner et al. |
| 2003/0235383 A1 | 12/2003 | Gardner et al. |
| 2004/0023822 A1 | 2/2004 | Ochs et al. |
| 2004/0075100 A1 | 4/2004 | Bogner et al. |
| 2004/0155373 A1 | 8/2004 | Lai et al. |
| 2004/0158019 A1 | 8/2004 | Lai et al. |
| 2004/0158020 A1 | 8/2004 | Lai et al. |
| 2004/0178509 A1 | 9/2004 | Yoshino et al. |
| 2004/0198924 A1 | 10/2004 | Young et al. |
| 2004/0236057 A1 | 11/2004 | Chevalier et al. |
| 2004/0245326 A1 | 12/2004 | Lai |
| 2004/0257191 A1 | 12/2004 | Muller |
| 2004/0257634 A1 | 12/2004 | Chakrapani et al. |
| 2005/0002105 A1 | 1/2005 | Nemoto et al. |
| 2005/0025442 A1 | 2/2005 | Kodama et al. |
| 2005/0038219 A1 | 2/2005 | Lai et al. |
| 2005/0070626 A1 | 3/2005 | Lowery |
| 2005/0213341 A1 | 9/2005 | Wehner |
| 2005/0287372 A1 * | 12/2005 | Gervasi et al. ................ 428/421 |
| 2006/0001036 A1 | 1/2006 | Jacob et al. |
| 2006/0105485 A1 | 5/2006 | Basin et al. |
| 2007/0004891 A1 * | 1/2007 | Ichinohe ......................... 528/25 |
| 2007/0112147 A1 | 5/2007 | Morita et al. |

FOREIGN PATENT DOCUMENTS

| | | |
|---|---|---|
| EP | 0 585 046 A2 | 3/1994 |
| GB | 2 073 765 A | 10/1981 |
| WO | WO 01/74554 A2 | 10/2001 |
| WO | WO 03/066707 A1 | 8/2003 |
| WO | WO 2004/037927 A1 | 5/2004 |
| WO | WO 2005/017995 | 2/2005 |
| WO | WO 2006/033375 A1 | 3/2006 |
| WO | WO 2006/045320 A2 | 5/2006 |

* cited by examiner

US 8,071,697 B2

SILICONE ENCAPSULANT COMPOSITION FOR MOLDING SMALL SHAPES

CROSS REFERENCE TO RELATED APPLICATIONS

This application is a U.S. national stage filing under 35 U.S.C. §371 of PCT Application No. PCT/US06/010001 filed on 16 Mar. 2006, currently pending, which claims the benefit of U.S. Provisional Patent Application No. 60/684,932 filed 26 May 2005 under 35 U.S.C. §119 (e). PCT Application No. PCT/US06/010001 and U.S. Provisional Patent Application No. 60/684,932 are hereby incorporated by reference.

TECHNICAL FIELD

This invention relates to a process for forming small shapes from silicone encapsulant compositions. The process is suitable for forming optical device components such as lenses for light emitting diode (LED) packages, and vertical cavity surface emitting lasers (VCSEL).

BACKGROUND

The fabrication of optical device components with precision using silicone compositions has been challenging using transfer molding or casting due to the long cycle times (on the order of several minutes) and high amounts of waste, e.g., up to 50% or more of curable silicone composition in these processes may be discarded as waste. In the past, injection molding was not accepted in industry because of defects observed in the molded parts (for example, cracks, air bubbles, and flow lines) and the difficulty of injecting a material with low viscosity; on the order of 100 to 3,000 centiPoise (cps) at molding process temperatures.

SUMMARY

This invention relates to a molding process and a silicone encapsulant composition suitable for use therein. The process comprises:

1) heating a mold having a mold cavity at a temperature ranging from 100° C. to 200° C.;

2) feeding a quantity of a silicone composition having a viscosity ranging from 50 cps to 3,000 cps at operating temperatures of the process to an assembly for preventing the silicone composition from flowing backward out of the assembly;

3) injecting the silicone composition from the assembly into the mold cavity through a gate, where the mold cavity has a top and a bottom, a vent is located at the top of the mold cavity, the vent comprises a channel 0.1 millimeter (mm) to 1 mm wide by 0.0001 to 0.001 mm deep, the gate is located at the bottom of the mold cavity, and injecting is performed at a pressure ranging from 1,000 pounds per square inch (psi) to 10,000 psi for up to 5 seconds;

4) holding the silicone composition at 1,000 psi to 10,000 psi for an amount of time sufficient to prevent the silicone composition from flowing out of the mold cavity;

5) curing the product of step 4).

DETAILED DESCRIPTION

All amounts, ratios, and percentages are by weight unless otherwise indicated. The following is a list of definitions as used in this application.

DEFINITIONS

The terms "a" and "an" each mean one more.

The abbreviation "M" means a siloxane unit of formula $R_3SiO_{1/2}$, where each R independently represents a monovalent atom or group.

The abbreviation "D" means a siloxane unit of formula $R_2SiO_{2/2}$, where each R independently represents a monovalent atom or group.

The abbreviation "T" means a siloxane unit of formula $RSiO_{3/2}$, where R represents a monovalent atom or group.

The abbreviation "Q" means a siloxane unit of formula $SiO_{4/2}$.

The abbreviation "Me" represents a methyl group.

The abbreviation "Ph" represents a phenyl group.

The abbreviation "Vi" represents a vinyl group.

Process

This invention relates to an injection molding process for forming shapes from silicone encapsulant compositions. The process comprises:

1) heating a mold having a mold cavity at a temperature ranging from 100° C. to 200° C.;

2) feeding a quantity of a silicone composition having a viscosity ranging from 50 cps to 3,000 cps at operating temperatures of the process to an assembly for preventing the silicone composition from flowing backward out of the assembly;

3) injecting the silicone composition from the assembly into a mold cavity through a gate, where the mold cavity has a top and a bottom, a vent is located at the top of the mold cavity, the vent comprises a channel 0.1 mm to 1 mm wide by 0.0001 mm to 0.001 mm deep, the gate is located at the bottom of the mold cavity, and injecting is performed at a pressure ranging from 1,000 psi to 10,000 psi, alternatively 2,000 psi to 6,000 psi, for up to 5 seconds;

4) holding the silicone composition at 1,000 psi to 10,000 psi for an amount of time sufficient to prevent the silicone composition from flowing out of the mold cavity;

5) curing the product of step 4). Step 4) and step 5) are performed until the resulting shape is hardened sufficiently to be removed from the mold.

The method may further comprise optional steps. Optional step 6) comprises post curing the product of step 5). Step 6) may be performed by heating at a temperature greater than the molding process temperature, e.g., ranging from 150° C. to 200° C. Optional step 7) comprises refilling the assembly using up to 3000 psi pressure after step 5) or step 6), when present. The method may optionally further comprise applying a mold release agent to the mold cavity before step 3).

The assembly in step 2) may be, for example, a screw check valve assembly or a plunger assembly. The time for step 4) may be up to 15 seconds, alternatively 8.5 seconds to 12.5 seconds. The time for step 5) may be 10 seconds to 300 seconds, alternatively 10 seconds to 120 seconds, and alternatively 25 to 50 seconds. The process steps may be performed while the mold is heated. The exact temperature depends on various factors the curing behavior of the silicone encapsulant composition selected, however, the mold may be heated at a temperature ranging from 100° C. to 200° C., alternatively 150° C. to 200° C.

Molding Equipment

The process described above may be performed using injection molding equipment that is known in the art and commercially available, for example, a liquid injection molding apparatus, Model No. 270S 250-60, from Arburg, Inc., of Newington, Conn., U.S.A. FIG. 1 is a schematic representation of liquid injection molding process equipment 100 for use in the method of this invention. The liquid injection molding process equipment 100 includes a feed system 101 for the two parts of a two part silicone encapsulant composition. The two parts are fed from the feed tanks 102, 103 to static mixer 104, which mixes the two parts. The resulting silicone encapsulant composition enters extruder 105 and assembly 110 for preventing the silicone encapsulant composition from flowing backward. The silicone encapsulant composition is then forced into a mold 106 through an inlet 107 to a sprue and runner system (not shown). The mold 106 may have various configurations. For example, FIGS. 2 and 3 represent cross sectional views taken along cross section line and 109 and show a mold 106 for making curved lenses. Alternatively, a one part curable liquid can be fed directly into extruder 105 and assembly 110 from feed tank 102 (bypassing the static mixer 104).

FIGS. 2 and 3 show cross sections of opposing sides of a mold 106 taken along line 109 in FIG. 1. The mold 106 has mold cavities 201 with vents 202 at the top of each mold cavity 201. The silicone encapsulant composition enters the mold 106 from a sprue 203 and flows through runners 204. The silicone encapsulant composition enters the mold cavities 201 through gates 205 at the bottom of each mold cavity 201. One side of the mold 106 has mold cavities 201 with hemispherical buttons 300 protruding from the mold cavities 201. The buttons 300 can be used for forming a curved molded shape and for aiding in de-molding the molded shape.

Silicone Compositions

The silicone compositions for use in the process described above may be optical silicone compositions. For example, these optical silicone compositions may exhibit properties including low viscosity (50 to 3,000 cps at molding process temperatures) and rapid cure times (10 seconds to 300 seconds). Low viscosity may be advantageous for injection molding because it may improve the ability of the optical silicone composition to rapidly and thoroughly fill mold features that define intricate optical features and smooth surfaces. Rapid cure time permits rapid production throughput. The optical silicone prepared by curing the optical silicone composition may exhibit properties including optical clarity, stability at high temperatures, and stability upon exposure to high flux at 400 nanometers (nm) to 650 nm.

The optical silicone composition may be an addition curable organopolysiloxane resin composition. An exemplary addition curable organopolysiloxane resin composition comprises:

(A) 100 parts of an organopolysiloxane resin represented by the following average compositional formula $$R^1_a R^2_b SiO_{(4-a-b)/2} \quad (1)$$

where each $R^1$ is independently an alkenyl group having 2 to 10 carbon atoms, each $R^2$ is independently a substituted or unsubstituted monovalent hydrocarbon group other than $R^1$, with the proviso that at least 50 mole % of $R^2$ comprise phenyl groups, subscript "a" has a value ranging from 0.09 to 0.16, and subscript "b" has a value ranging from 1.00 to 1.20; with the proviso that the organopolysiloxane resin has a weight-average molecular weight equal to or exceeding 3000 with polystyrene as reference and determined by gel chromatography;

(B) 10 to 50 parts by weight of an organooligosiloxane represented by the following average compositional formula $$R^3_c R^4_d SiO_{(4-c-d)/2} \quad (2)$$

where each $R^3$ is independently an alkenyl group having 2 to 10 carbon atoms, each $R^4$ is independently a substituted or unsubstituted monovalent or non-substituted monovalent hydrocarbon group other than $R^3$, with the proviso that at least 10 mole % of $R^4$ comprise phenyl groups; subscript "c" has a value ranging from 0.60 to 0.80, and subscript "d" has a value ranging from 1.50 to 2.10;

(C) 20 to 100 parts by weight of an organohydrogenoligosiloxane or organohydrogenpolysiloxane represented by the following average compositional formula:

$$H_e R^5_f SiO_{(4-e-f)/2} \quad (3)$$

where each $R^5$ is independently a substituted or unsubstituted monovalent or non-substituted monovalent hydrocarbon group other than alkenyl groups, with the proviso that at least 20 mole % of $R^5$ comprise phenyl groups; subscript "e" has a value ranging from 0.35 to 0.65, and subscript "f" has a value ranging from 0.90 to 1.70; and (D) a catalytic quantity of an addition-reaction catalyst. This addition curable organopolysiloxane composition may cure to form an article having a hardness ranging from 60 to 100 at 25° C. and 40 to 100 at 150° C. as measured by ASTM D2240-86.

Alternatively, in average compositional formula (1), "a" may have a value ranging from 0.10 to 0.15, and "b" may have a value ranging from 1.00 to 1.15. Alternatively, in average compositional formula (2), "c" may have a value ranging from 0.60 to 0.80, and "d" may have a value ranging from 1.50 to 2.00. Alternatively, in average-compositional formula (3), "e" may have a value ranging from 0.35 to 0.65, and "f" may have a value ranging from 1.30 to 1.70.

Alternatively, component (B) in the addition-curable organopolysiloxane resin composition described above may comprise an organooligosiloxane expressed by the following formula:

$$(R^7 R^8_2 SiO)_g SiR^8_{(4-g)} \quad (4)$$

where each $R^7$ is independently an alkenyl group with 2 to 10 carbon atoms, each $R^8$ is independently a substituted or unsubstituted monovalent hydrocarbon group other than $R^7$, with the proviso that at least 10 mole % of $R^8$ comprise phenyl groups; and subscript "g" is 2 or 3.

Component (A)

In average compositional formula (1), described above, alkenyl groups with 2 to 10 carbon atoms for $R^1$ include, but are not limited to, vinyl groups, allyl groups, butenyl groups, hexenyl groups, and decenyl groups. Examples of $R^2$ include, but are not limited to, alkyl groups such as methyl groups, ethyl groups, propyl groups, and cyclohexyl groups; aryl groups such as tolyl groups and naphthyl groups; haloalkyl groups such as 3-chloropropyl groups, 3,3,3-trifluoropropyl groups, and 2-(nonafluoropropyl)ethyl groups; and aralkyl groups such as ethylbenzyl groups and 1-phenethyl groups. For providing an optical silicone encapsulant prepared by curing the above composition and having with high transparency, strength, and hardness, at least 50 mole % of all $R^2$ per molecule may comprise phenyl groups, while the remaining may be alkyl groups.

Siloxane units that form component (A) may be exemplified by $ViMe_2SiO_{1/2}$ units, $ViMePhSiO_{1/2}$ units, $Me_3SiO_{1/2}$ units, $Me_2SiO_{2/2}$ units, $ViMeSiO_{2/2}$ units, $PhSiO_{3/2}$ units, $MeSiO_{3/2}$ units, and $ViSiO_{3/2}$ units, where Me designates methyl group, Vi designates vinyl group, and Ph designates phenyl group.

Examples of component (A) are organopolysiloxane resins shown by the siloxane unit formulae and average compositional formulae given below; the siloxane unit formulae indicate mole numbers of various siloxane units when all siloxane units of a molecule constitute 1 mole:

(i) Unit formula $(ViMe_2SiO_{1/2})_{0.10}(PhSiO_{3/2})_{0.90}$, which has average compositional formula $Vi_{0.10}Me_{0.20}Ph_{0.90}SiO_{1.4}$, where a=0.10, b=1.10, $Ph/R^{2\prime}$ (mole %)=74, Mw=4300;

(ii) Unit formula $(ViMe_2SiO_{1/2})_{0.14}(PhSiO_{3/2})_{0.86}$, which has average compositional formula $Vi_{0.14}Me_{0.28}Ph_{0.86}SiO_{1.34}$, where a=0.14, b=1.14, $Ph/R^{2\prime}$ (mole %)=67, Mw=3200;

(iii) Unit formula $(ViMeSiO_{2/2})_{0.10}(PhSiO_{3/2})_{0.90}$, which has average compositional formula $Vi_{0.10}Me_{0.10}Ph_{0.90}SiO_{1.45}$, where a=0.10, b=1.00, $Ph/R^{2\prime}$ (mole %)=82, Mw=8700;

(iv) Unit formula $(ViMeSiO_{2/2})_{0.10}(Me_2SiO_{2/2})_{0.15}(PhSiO_{3/2})_{0.75}$, which has average compositional formula $Vi_{0.10}Me_{0.40}Ph_{0.75}SiO_{1.375}$, where a=0.10, b=1.15, $Ph/R^{2\prime}$ (mole %)=60, Mw=7200;

where $R^{2\prime}$ represents total mole quantity of Me and Ph, and Mw is a weight-average molecular weight using standard polystyrene as a reference determined by gel permeation chromatography.

Component (B)

Component (B) is represented by average compositional formula (2) $R^3_c R^4_d SiO_{(4-c-d)/2}$ where each $R^3$ is independently an alkenyl group with 2 to 10 carbon atoms that can be the same as the groups exemplified for $R^1$, and each $R^4$ is independently a substituted or unsubstituted monovalent hydrocarbon group other than $R^3$ that can be the same as the groups listed for $R^2$. At least 10 mole % of $R^4$ may comprise phenyl groups, while the remaining groups may comprise alkyl groups. Alternatively, each $R^4$ may comprise a phenyl group. Alternatively, each $R^4$ may comprise a methyl group or a phenyl group. Without wishing to be bound by theory it is thought that when each $R^4$ is a methyl group or a phenyl group, affinity between components (A) and (C) in the composition may be improved and resistance to heat and transparency in an article, such as a lens, prepared by curing the composition may be improved.

In formula (2), "c" designates an average number of alkenyl groups per silicon atom in component (B) and may have a value ranging from 0.60 to 0.80. In formula (2), "d" designates an average number of substituted or unsubstituted monovalent hydrocarbon groups (other than $R^3$) per 1 silicon atom in component (B) may have a value ranging from 1.50 to 2.10, alternatively 1.50 to 2.00.

Alternatively, component (B) may comprise an alkenyl-functional organooligosiloxane of formula (4): $(R^7R^8_2SiO)_g SiR^8_{(4-g)}$, where each $R^7$ is as described above and may be the same as those listed above for $R^1$. In the above formula, each $R^8$ is independently a substituted or unsubstituted monovalent hydrocarbon group (other than $R^7$) where $R^8$ may be a group that is the same as those listed above for $R^2$. Alternatively, each $R^8$ may comprise a phenyl group. Alternatively, each $R^8$ may comprise a phenyl group or a methyl group. Subscript "g" is 2 or 3. To facilitate dissolving component (A) (when component (A) is a solid) or to reduce viscosity of component (A) (when component (A) is viscous) at room temperature, component (B) may be liquid at room temperature and have viscosity at 25° C. below 10 Pa·s, alternatively viscosity ranging from 1 mPa·s to 100 mPa·s.

Specific examples of component (B) are methylphenylvinyloligosiloxanes shown by the following siloxane unit formulae and average compositional formulae:

(i) Unit formula $(ViMe_2SiO)_3SiPh$, which has average compositional formula $Vi_{0.75}Me_{1.50}Ph_{0.25}SiO_{0.75}$, where c=0.75, d=1.75, $Ph/R^{4\prime}$ (mole %)=14;

(ii) Unit formula $(ViMe_2SiO)_2SiPh_2$, which has average compositional formula $Vi_{0.67}Me_{1.33}Ph_{0.67}SiO_{0.67}$, c=0.67, d=2.0, $Ph/R^{4\prime}$ (mole %)=33;

(iii) Unit formula $(ViMePhSiO)_3SiPh$, which has average compositional formula $Vi_{0.75}Me_{0.75}Ph_{1.00}SiO_{0.75}$, c=0.75, d=1.75, $Ph/R^{4\prime}$ (mole %)=57;

(iv) Unit formula $(ViMePhSiO)_2SiPh_2$, which has average compositional formula $Vi_{0.67}Me_{0.67}Ph_{1.33}SiO_{0.67}$, c=0.67, d=2.00, $Ph/R^{4\prime}$ (mole %)=67; and (v) Unit formula $(ViMe_2SiO)_2SiMePh$, which has average compositional formula $Vi_{0.67}Me_{1.67}Ph_{0.33}SiO_{0.67}$, c=0.67, d=2.00, $Ph/R^{4\prime}$ (mole %)=17.

where $R^{4\prime}$ represents total mole quantity of Me and Ph. Component (B) may be a combination comprising two or more components differing in at least one of the following properties molecular weight, siloxane units, structure, and sequence.

Component (C)

Component (C) represented by average compositional formula (3) above comprises an organohydrogenoligosiloxane or organohydrogenpolysiloxane. Silicon-bonded hydrogen atoms of this component participate in an addition reaction with silicon-bonded alkenyl groups of components (A) and (B).

In average compositional formula (3) at least 20 mole % of $R^5$ comprise phenyl groups. Groups $R^5$ may be the same as those listed above for $R^2$, alternatively, each $R^5$ may be a phenyl group, alternatively, each $R^5$ may be selected from a methyl group and a phenyl group. In formula (3), "e" indicates number of silicon-bonded hydrogen atoms per one silicon atom of component (C) and may range from 0.35 to 0.65; "f" indicates an average number of substituted or unsubstituted monovalent hydrocarbon groups (other than $R^1$) per one silicon atom of component (C) and may range from 0.90 to 1.70, alternatively 1.30 to 1.70. At 25° C., component (C) may be solid or liquid, but the liquid form may facilitate preparation of the composition. Viscosity of component (C) may be up to 100 Pa·s, alternatively viscosity may range from 1 to 1,000 mPa·s.

Examples of component (C) include but are not limited to methylphenylhydrogenoligosiloxanes and methylphenylhydrogenpolysiloxanes shown by the following siloxane unit formulae and average compositional formulae:

(i) Unit formula $(HMe_2SiO_{1/2})_{0.65}(PhSiO_{3/2})_{0.35}$, which has average compositional formula $H_{0.65}Me_{1.30}Ph_{0.35}SiO_{0.85}$, e=0.65, f=1.65, $Ph/R^{5\prime}$ (mole %)=21;

(ii) Unit formula $(HMe_2SiO_{1/2})_{0.60}(PhSiO_{3/2})_{0.40}$, which has average compositional formula $H_{0.60}Me_{1.2}Ph_{0.40}SiO_{0.90}$, e=0.60, f=1.60, $Ph/R^{5\prime}$ (mole %)=25;

(iii) Unit formula $(HMe_2SiO_{1/2})_{0.40}(PhSiO_{3/2})_{0.60}$, which has average compositional formula $H_{0.40}Me_{0.80}Ph_{0.60}SiO_{1.10}$, e=0.40, f=1.40, $Ph/R^{5\prime}$ (mole %)=43;

(iv) Unit formula $(HMe_2SiO_{1/2})_{0.35}(PhSiO_{3/2})_{0.65}$, which has average compositional formula $H_{0.35}Me_{0.70}Ph_{0.65}SiO_{1.15}$, e=0.35, f=1.05, $Ph/R^{5\prime}$ (mole %)=48;

(v) Unit formula $(HMeSiO_{2/2})_{0.65}(PhSiO_{3/2})_{0.35}$, which has average compositional formula $H_{0.65}Me_{0.65}Ph_{0.35}SiO_{1.175}$, e=0.65, f=1.00, $Ph/R^{5\prime}$ (mole %)=35;

(vi) Unit formula $(HMe_2SiO_{2/2})_{0.50}(PhSiO_{3/2})_{0.50}$, which has average compositional formula $H_{0.5}Me_{0.50}Ph_{0.50}SiO_{1.25}$, e=0.50, f=1.00, Ph/R$^{5'}$ (mole %)=50;

(vii) Unit formula $(HMeSiO_{2/2})_{0.35}(PhSiO_{3/2})_{0.65}$, which has average compositional formula $H_{0.35}Me_{0.35}Ph_{0.65}SiO_{1.325}$, e=0.35, f=1.00, Ph/R$^{5'}$ (mole %)=65;

(viii) Unit formula $(HMePhSiO_{1/2})_{0.60}(PhSiO_{3/2})_{0.40}$, which has average compositional formula $H_{0.60}Me_{0.60}Ph_{1.00}SiO_{0.90}$, e=0.60, f=1.60, Ph/R$^{5'}$ (mole %)=63; and (ix) Unit formula $(HMePhSiO_{1/2})_{0.40}(PhSiO_{3/2})_{0.60}$, which has average compositional formula $H_{0.4}Me_{0.40}Ph_{1.00}SiO_{1.10}$, e=0.40, f=1.40, Ph/R$^{5'}$ (mole %)=71.

In these formulae, R$^{5'}$ represents total quantity of Me and Ph. Component (C) may be a combination comprising two or more components differing in at least one of the following properties molecular weight, siloxane units, structure, and sequence.

Components (B) and (C) may be used in a combined amount of 10 to 50 parts by weight, alternatively 20 to 100 parts by weight, per 100 parts by weight of component (A). To provide hardness and physical properties in a silicone encapsulant prepared by curing the composition, the amount of silicon-bonded hydrogen atoms of component (C) per mole of alkenyl groups in components (A) and (B) may range from 0.5 to 3 moles, alternatively 0.7 to 2.0 moles.

Component (D)

Component (D) is a catalyst that promotes an addition reaction between alkenyl groups of components (A) and (B) and silicon-bonded hydrogen atoms of component (C). Component (D) is exemplified by platinum group metal catalysts such as platinum metal catalysts exemplified by platinum black, platinum dichloride, chloroplatinic acid, a product of a reaction between a chloroplatinic acid and a monohydric alcohol, a complex of a chloroplatinic acid and diolefin, platinum bis-(ethylacetoacetate), platinum bis-(acetylacetonate), a complex of a chloroplatinic acid and 1,3-divinyltetramethyldisiloxane, or a combination thereof; and rhodium catalysts. The amount of component (D) is a catalytic amount, which depends on various factors including the exact components (A), (B), (C), and (D) selected. However, the amount of component (D) may range from 1 to 500 ppm, alternatively 2 to 100 ppm, based on the combined weights of components (A) to (C).

Optional Components

An optional component may be added to the addition-curable organopolysiloxane resin composition described above. Optional component (E), a mold release agent, may be added to the composition. Suitable mold release agents may be polyorganosiloxanes that are not reactive with components (A), (B), (C) and (D) in the composition. Suitable mold release agents may have the general formula: $R^9_3SiO(R^9_2SiO)_x(R^9R^{10}SiO)_ySiR^9_3$, where each $R^9$ is independently a hydroxyl group or a monovalent organic group, and each $R^{10}$ is independently a monovalent organic group unreactive with components (A), (B), and (C) in the composition, x has a value of 0 or greater, y has a value of 1 or greater with the proviso that x and y have values sufficient that the mold release agent has a viscosity of 50 to 3,000 cps at molding process temperatures. Alternatively, each $R^9$ may independently be an alkyl group such as methyl, ethyl, propyl, or butyl or an alkoxy group such as methoxy, ethoxy, propoxy, or butoxy, and each $R^{10}$ may independently be an aryl group such as phenyl, tolyl, or xylyl. Alternatively each $R^9$ may be methyl and each $R^{10}$ may be phenyl. Examples of suitable mold release agents include trimethylsiloxy-terminated (dimethylsiloxane/phenylmethylsiloxane)copolymer having a viscosity of 100 to 500 cps at 25° C. The amount of mold release agent in the composition may be 0.2% to 2%, alternatively 0.25% to 0.75%, based on the weight of the composition.

To extend the pot life, an inhibitor that will inhibit curing at room temperature may be added. Provided their addition is not detrimental to the effects of the present invention, the composition may further comprise a filler such as fumed silica, quartz powder, titanium oxide, zinc oxide; pigment; flame retarder; heat-resistant agent; oxidation inhibitor; or a combination thereof.

The addition-curable organopolysiloxane resin composition of the invention can be prepared by mixing components (A) to (D) and any optional components, if present. If a one part composition will be prepared, pot life of the composition may be extended by adding an inhibitor. Alternatively, a multiple-part composition may be prepared by mixing components comprising (A), (B), and (D) in one part and mixing components comprising (A), (B) and (C) in a separate part, storing each part in a premixed state, and mixing the parts together directly before use.

The addition-curable organopolysiloxane resin composition of the present invention prepared by the above method cures to form an article having a hardness of 60 to 100 at 25° C. and hardness of 40 to 100 at 150° C., as measured by Type D durometer in accordance with ASTM D2240-86. Alternatively, the article obtained from the addition-curable organopolysiloxane resin composition has hardness ranging from 40 to 100, alternatively 40 to 60, as measured in accordance with ASTM D2240-86 by the type D durometer. ASTM D2240-86 corresponds to JIS K 7215-1986 that specifies testing methods for durometer hardness of plastics.

The addition-curable organopolysiloxane resin composition may be a liquid at room temperature. However, to improve moldability and flowability, the composition may have viscosity at 25° C. below 5,000 Pa·s, alternatively viscosity may range from 10 to 1,000 Pa·s, alternatively viscosity may range from 100 to 3,000 cps. The addition-curable organopolysiloxane resin composition may be gradually cured by retaining it at room temperature or rapidly cured by heating. The composition may be cured alone or in contact with another material, to form an integrated body with the other material (overmolding).

Alternatively, commercially available optical silicone encapsulant composition may be used, such as SYLGARD® 184 from Dow Corning Corporation of Midland, Mich., U.S.A. Alternatively, organopolysiloxane resin compositions in U.S. Pat. No. 6,509,423 may be used in the process of this invention.

Optical Devices

The process and composition described above may be used to fabricate various components in optical devices. For example, such optical devices include, but are not limited to optical waveguides, lightguides, light sensing elements, and LED packages such as high brightness LED (HBLED) packages.

This invention further relates to a molded shape prepared by the process described above. The molded shape may be, for example, a lens for use in an LED package such as a flat lens, a curved lens, or a fresnel lens. Curved and fresnel lenses made from an amount of silicone encapsulant composition ranging from 10 milligrams (mg) to 60 grams (g) may be fabricated. The lenses may have a width or diameter ranging from 0.1 mm to 10 mm. The lenses may have thickness ranging from 0.05 mm to 2 mm. For lenses having thickness of 2 mm, optical transmission at 400 nanometers (nm) to 650 nm may be 85% transmission to 100% transmission.

EXAMPLES

These examples are intended to illustrate the invention to one of ordinary skill in the art and should not be interpreted as limiting the scope of the invention set forth in the claims.

Example 1

Fabricating Curved Lenses

Curved lenses are fabricated according to the process of this invention using the injection molding equipment in FIG. 1 and the mold in FIGS. 2 and 3. The mold is heated at a temperature (° C.) shown in Table 1. An addition curable organopolysiloxane resin composition is fed through the static mixer 104 to the extruder 105 and a quantity of the resulting curable organopolysiloxane resin composition (cubic inches, cin) is fed to the assembly 110. The quantity is shown in Table 1. This quantity of curable organopolysiloxane resin composition comprises: 82.5 parts $D^{Vi}_{10}D_{15}T^{Ph}_{75}$, 10 parts $M^{Vi}D^{Ph2}$, 10 parts $M^{Vi}_{3}T^{Ph}$, $M^{H}_{60}T^{Ph}_{40}$, 0.013 parts platinum catalyst and 0.10 parts platinum catalyst inhibitor of formula $HC\equiv C-C(Me)_2-O_3SiMe$; where the subscript represents the number of siloxane units and the superscript represents any monovalent radicals bonded to silicon other than methyl.

The quantity of curable organopolysiloxane resin composition is injected into the mold 106 and the resulting composition is injected into the mold cavities 201 in stages. The injection pressure (pounds per square inch, psi), the injection speed (cubic inches per second, cins) and volume injected (cin) in each stage are shown in Table 1. The back pressure (psi) and screw speed (circumferential speed in feet per minute, fpm) applied during injection are also shown in Table 1.

The composition is then held in the mold at a pressure and for a time shown in Table 1. The starting pressure in holding stage 1 (shown in Table 1) is gradually reduced to the pressure in holding stage 2 during the time for holding stage 1. The composition is then held under the conditions in holding stage 2. The composition is then cured for a time shown in Table 1 until the resulting lens is hardened sufficiently to be removed from the mold. The lenses are then de-molded. Visual evaluation of the curved lenses is recorded in Table 1. Example 1 shows that acceptable curved lenses can be fabricated using the composition at various molding process conditions.

Example 2

Fabricating Curved Lenses

Curved lenses are fabricated according to the procedure in Example 1 using the process parameters in Table 2. The curable organopolysiloxane resin composition in Example 2 comprises 82.5 parts $T^{Ph}_{0.75}Q_{0.10}M^{Vi}_{0.15}$, 8.9 parts $Ph_2Si(OSiMe_2H)_2$, 5.9 parts $PhSi(OSiMe_2H)_3$, 1.01 parts bis-diphenylphosphino propane, and 5 parts per million (ppm) platinum catalyst. Comparative runs 1-4 show that incomplete fill can result with some formulations when the quantity supplied is too low, when back pressure is too low, or both. Runs 5-18 show that acceptable molded parts can be made at a variety of process conditions.

Example 3

Fabricating Curved Lenses

Curved lenses are fabricated according to the procedure in Example 1 using the process parameters in Table 3. The organopolysiloxane resin composition in Example 3 comprises 67.5 parts DOW CORNING® SYLGARD® 184 Part A, 9.5 parts DOW CORNING® SYLGARD® 184 Part B, 9.01 parts $Si(SiMe_2CH=CH_2)_4$, $MD_{3.2}DH_{5.8}M$, and 13.9 parts $MD_{3.2}D^{H}_{5.8}M$. Comparative runs 1-7 do not make acceptable lenses due to air entrained in the feed system. Runs 8-13 make acceptable lenses even though bubbles are present. As the composition was processed and entrained air was removed, lens quality improved in this example.

Example 4

Fabricating Curved Lenses with Vertical Mold Orientation

Curved lenses are fabricated according to the process of this invention using the injection molding equipment in FIG. 1 and the mold in FIGS. 2 and 3, except that the mold orientation is changed from horizontal to vertical. The two part addition curable organopolysiloxane resin composition in Example 4 comprises 65% $T^{Ph}_{0.75}M^{Vi}_{0.25}$, 21.6% $T^{Ph}_{0.75}Q_{0.10}M^{Vi}_{0.25}$, 12% $HMe_2SiØSiMe_2H$, 0.4% $[Vi(Ph,Me)Si-O]_2$, 26 ppm triphenyl phosphine inhibitor, and 5 ppm platinum catalyst, where Ø represents a phenylene group. The molding process conditions and results are in Table 4. Example 4 shows that changing from a horizontal to a vertical mold orientation without changing the vents to the top is less effective than a horizontal mold orientation using this equipment and this silicone encapsulant composition under certain molding process parameters.

Example 5

Fabricating Curved Lenses

Curved lenses are fabricated according to the procedure in Example 1 using the process parameters in Table 5. The two part addition curable organopolysiloxane resin composition in Example 5 comprises 39.7 parts $T^{Ph}_{0.75}M^{Vi}_{0.25}$, 13.3 parts $T^{Ph}_{0.75}Q_{0.10}M^{Vi}_{0.25}$, 34.8 parts $M^{Vi}D^{Ph}_{220}M^{Vi}$, 4.3 parts $SiPh_2(OSiMe_2H)_2$, 5.9 parts $SiPh(OSiMe_2H)_3$, 22 ppm triphenyl phosphine inhibitor, and 3 ppm platinum catalyst. Example 5 shows that acceptable lenses may be fabricated from the compositions at a variety of molding process parameters in runs 1-6 and 9-18. Runs 7 and 8 did not produce acceptable lenses because the thermal history of the organopolysiloxane resin caused the molded lens to be yellow.

Example 6

Fabricating Curved Lenses

Curved lenses are fabricated according to the procedure in Example 1 using the process parameters in Table 6. The two part addition curable organopolysiloxane resin composition in Example 6 comprises 51.5 parts $D^{Vi}_{10}D_{15}T^{Ph}_{75}$, 10 parts $M^{Vi}D^{Ph2}$, 10 parts $M^{Vi}_{3}T^{Ph}$, 28.4 parts $M^{H}_{60}T^{Ph}_{40}$, 0.013 parts platinum catalyst, and 0.10 parts inhibitor of formula $(HC\equiv C-C(Me)_2-O)_3SiMe$. Example 6 shows that good curved lenses can be fabricated from the composition at a variety of molding process conditions.

Example 7

Fabricating Curved Lenses

Curved lenses are fabricated according to the procedure in Example 1 using the process parameters in Table 7. The two part addition curable organopolysiloxane resin composition in Example 7 comprises 39.7 parts $T^{Ph}_{0.75}M^{Vi}_{0.25}$, 15.3 parts $T^{Ph}_{0.75}Q_{0.10}$ $M^{Vi}_{0.25}$, 34.8 parts $M^{Vi}D^{Ph}_{220}M^{Vi}$, 4.3 parts $SiPh_2(OSiMe_2H)_2$, 5.9 parts $SiPh(OSiMe_2H)_3$, 22 ppm triphenyl phosphine inhibitor, and 3 ppm platinum catalyst. Example 7 shows that good curved lenses can be fabricated from the composition at a variety of molding process conditions.

Example 8

Fabricating Fresnel Lenses

Fresnel lenses are fabricated according to the process of this invention using the injection molding equipment in FIG. 1 and a fresnel lens mold. The mold is heated to a temperature (° C.) shown in Table 8. A two part addition curable organopolysiloxane resin composition is fed through the static mixer 104 to the extruder 105 and a quantity of the resulting curable organopolysiloxane resin composition is fed to the assembly 110. This curable organopolysiloxane resin composition is the same as in Example 6.

The curable organopolysiloxane resin composition is injected into the mold cavities 201 in stages. The injection pressure (psi), the injection speed (cubic inches per second, cins) and volume injected (cin) in each stage are shown in Table 8. The back pressure (psi) and screw speed (feet per minute, fpm) applied during injection are also shown in Table 8.

The composition is then held in the mold at pressures and for times shown in Table 8. The starting pressure in holding stage 1 (shown in Table 8) is gradually reduced to the pressure in holding stage 2 during the time for holding stage 1. The composition is then held under the conditions in holding stage 2. The composition is then cured for a time shown in Table 8 until the resulting shape is hardened sufficiently to be removed from the mold. The lenses are then de-molded. Visual evaluation of the curved lenses is recorded in Table 8. Example 8 shows that curing the composition used in example 8 too long or at too high a temperature may cause the molded lenses to become thin or brittle, or to make demolding somewhat difficult, however, acceptable lenses are made under process conditions in example 8.

Example 9

Fabricating Fresnel Lenses

Fresnel lenses are fabricated according to the procedure in Example 8 using the process parameters in Table 9. Example 9 shows that acceptable fresnel lenses can be made with this equipment and this curable silicone encapsulant composition by adjusting the molding process parameters. Comparative runs 1 to 8 show that a larger quantity is needed for these process conditions to completely fill the mold without over filling and obtaining molded lenses with flash. Runs 9 to 15 produce acceptable lenses.

Example 10

Effect of Applying Mold Release Agent to Mold Cavity

Curved lenses are fabricated according to the process of Example 1 except that a mold release agent is applied to the surface of the mold cavities at the beginning of the process. The mold release agent is a TEFLON® spray. The curable organopolysiloxane resin composition in Example 10 comprises 51 parts $D^{Vi}_{10}D_{15}T^{Ph}_{75}$, 10 parts $M^{Vi}D^{Ph2}$, 10 parts $M^{Vi}_3T^{Ph}$, 28.4 parts $M^H_{60}T^{Ph}_{40}$, 0.5 parts $M[D^{Ph,Me}D]_3M$, 0.013 parts platinum catalyst, and 0.10 parts (HC≡C—C (Me)$_2$—O)$_3$SiMe inhibitor. The molding process parameters and results are in Table 10.

Example 11

Effect of Adding Mold Release Agent to the Addition Curable Organopolysiloxane Resin Composition Example 10 is repeated except that the TEFLON® spray is eliminated and 0.5% of trimethylsiloxy-terminated (dimethylsiloxane/phenylmethylsiloxane)copolymer having a viscosity of 100 to 150 cps at 25° C. is added to the composition. Examples 10 and 11 show that before an internal mold release agent is added to the composition of Example 10, 33 to 100% of the curved lenses may crack when being removed from the mold, even when a mold release agent is applied to the mold cavity. However, when the internal mold release agent is added, after 15 molding cycles, release becomes easier, and after 25 cycles cracking may reduce to zero. Without wishing to be bound by theory, it is thought that the internal mold release agent used in this example conditions the mold over time.

Examples 12 and 13

Effect of Adding Mold Release Agent to the Addition Curable Organopolysiloxane Resin Composition Examples 10 and 11 are repeated except that in example 13, the TEFLON® spray is eliminated and a mold release agent is added to the composition. The composition used in example 12 comprises 51.5 parts $D^{Vi}_{10}D_{15}T^{Ph}_{75}$, 10 parts $M^{Vi}D^{Ph2}$, 10 parts $M^{Vi}_3T^{Ph}$, 28.4 parts $M^H_{60}T^{Ph}_{40}$, 0.013 parts platinum catalyst, and 0.10 parts inhibitor (HC≡C—C (Me)$_2$—O)$_3$SiMe; and the composition used in example 13 comprises 51 parts $D^{Vi}_{10}D_{15}T^{Ph}_{75}$, 10 parts $M^{Vi}D^{Ph2}$, 10 parts $M^{Vi}_3T^{Ph}$, 28.4 parts $M^H_{60}T^{Ph}_{40}$, 0.5 parts HO[Si(Ph,Me)O]$_{4-7}$H, 0.013 parts platinum catalyst, and 0.1 parts (HC≡C—C (Me)$_2$—O)$_3$SiMe inhibitor.

The molding conditions used in each run in examples 12 and 13 are as follows: mold temperature 150 C, quantity 0.345 cin, back pressure −150 psi, screw speed of 25, injection stage 1 pressure/speed/volume of 3000/0.6/0.16, injection stage 2 pressure/speed/volume of 2500/0.1/0.09, holding stage 1 pressure/time of 2500/10 and holding stage 2 of 1200/10, and cure time of 30 seconds. Tables 12 and 13 show the results of examples 12 and 13, respectively. Without wishing to be bound by theory, it is thought that the internal mold release agent in example 13 conditions the mold over time.

Example 14

No Mold Release Agent

Example 12 is repeated except that the composition comprises 51.5 parts $D^{Vi}_{10}D_{15}T^{Ph}_{75}$, 10 parts $M^{Vi}D^{Ph2}$, 10 parts $M^{Vi}_3T^{Ph}$, 28.4 parts $M^H_{60}T^{Ph}_{40}$, 0.013 parts platinum catalyst, and 0.10 parts inhibitor (HC≡C—C (Me)$_2$—O)$_3$SiMe.

INDUSTRIAL APPLICABILITY

Optical silicone encapsulant compositions are useful for fabrication components of optical devices such as LED packages. Silicone encapsulants prepared by curing these compositions may provide the benefits of enhanced light transmission, enhanced reliability, and increased lifetimes of LED packages. Silicone encapsulants may exhibit superior performance over epoxy encapsulants in temperature and humidity resistance in LED applications. The silicone encapsulant compositions and processes of this invention may be used to prepare encapsulants having geometries including, but not limited to, rectangular, simple convex lenses, patterned lenses, textured surfaces, domes, and caps. In optical device applications the encapsulants may be pre-manufactured by molding (injection or transfer) or casting processes. Alternatively, a process for molding over an optical device assembly, called 'overmolding' or "insert molding" on a rigid or flexible substrate may also be performed using the heat curable silicone encapsulants of this invention.

TABLE 1

| Run | Mold Temp. | Quantity (cin) | Back Pressure | Screw Speed | Injection Stage 1 Pressure | Injection Stage 1 Speed | Injection Stage 1 Volume | Injection Stage 2 Pressure | Injection Stage 2 Speed | Injection Stage 2 Volume | Holding Stage 1 Pressure | Holding Stage 1 Time | Holding Stage 2 Pressure | Holding Stage 2 Time | Cure Time | Performance |
|---|---|---|---|---|---|---|---|---|---|---|---|---|---|---|---|---|
| 1 | 100 | 0.2975 | −200 | 35 | 2700 | 0.2 | 0.18 | 2450 | 0.04 | 0.09 | 2300 | 8 | 1700 | 4.5 | 60 | SB |
| 2 | 100 | 0.2975 | −200 | 35 | 2700 | 0.2 | 0.18 | 2450 | 0.04 | 0.09 | 2300 | 8 | 1700 | 4.5 | 60 | SB |
| 3 | 100 | 0.3050 | −200 | 35 | 2700 | 0.2 | 0.18 | 2450 | 0.04 | 0.09 | 2300 | 8 | 1700 | 4.5 | 45 | SB |
| 4 | 115 | 0.3050 | −200 | 35 | 2700 | 0.2 | 0.18 | 2450 | 0.04 | 0.09 | 2300 | 8 | 1700 | 4.5 | 45 | SB |
| 5 | 115 | 0.3050 | −200 | 35 | 2700 | 0.2 | 0.18 | 2450 | 0.04 | 0.09 | 2300 | 8 | 1700 | 4.5 | 35 | SB |
| 6 | 115 | 0.3050 | −200 | 35 | 2700 | 0.2 | 0.18 | 2450 | 0.04 | 0.09 | 2300 | 8 | 1700 | 4.5 | 35 | SB |
| 7 | 115 | 0.3050 | −300 | 35 | 2700 | 0.2 | 0.18 | 2450 | 0.04 | 0.09 | 2300 | 8 | 1700 | 4.5 | 30 | SB |
| 8 | 115 | 0.3100 | −300 | 35 | 2700 | 0.2 | 0.18 | 2450 | 0.06 | 0.09 | 2300 | 8 | 1700 | 4.5 | 30 | SB |
| 9 | 115 | 0.3100 | −300 | 35 | 2700 | 0.2 | 0.18 | 2450 | 0.06 | 0.09 | 2300 | 8 | 1700 | 4.5 | 30 | SB |
| 10 | 115 | 0.3100 | −350 | 35 | 2700 | 0.2 | 0.18 | 2450 | 0.06 | 0.09 | 2300 | 8 | 1700 | 4.5 | 30 | SB |
| 11 | 115 | 0.3100 | −350 | 35 | 2700 | 0.2 | 0.18 | 2450 | 0.07 | 0.09 | 2300 | 8 | 1700 | 4.5 | 30 | SB |
| 12 | 115 | 0.3100 | −400 | 35 | 2700 | 0.2 | 0.18 | 2450 | 0.07 | 0.09 | 2300 | 8 | 1700 | 4.5 | 30 | SB |
| 13 | 115 | 0.3100 | −400 | 35 | 2700 | 0.22 | 0.18 | 2450 | 0.08 | 0.09 | 2300 | 8 | 1700 | 4.5 | 29 | SB |
| 14 | 115 | 0.3100 | −450 | 15 | 2700 | 0.22 | 0.18 | 2450 | 0.08 | 0.09 | 2300 | 8 | 1700 | 4.5 | 29 | SB |
| 15 | 115 | 0.3100 | −450 | 15 | 2700 | 0.22 | 0.18 | 2450 | 0.08 | 0.09 | 2300 | 8 | 1700 | 4.5 | 29 | SB |
| 16 | 115 | 0.3100 | −450 | 15 | 2800 | 0.23 | 0.12 | 2450 | 0.08 | 0.09 | 2300 | 8 | 1700 | 4.5 | 29 | SB |
| 17 | 115 | 0.3100 | −450 | 5 | 2800 | 0.23 | 0.12 | 2450 | 0.08 | 0.09 | 2300 | 8 | 1700 | 4.5 | 29 | SB |
| 18 | 115 | 0.3100 | −450 | 5 | 2800 | 0.23 | 0.12 | 2450 | 0.08 | 0.09 | 2300 | 8 | 1700 | 4.5 | 29 | SB |
| 19 | 115 | 0.3300 | −450 | 5 | 2900 | 0.25 | 0.16 | 2450 | 0.06 | 0.09 | 2300 | 8 | 1700 | 4.5 | 29 | SB |
| 20 | 115 | 0.3300 | −450 | 5 | 2900 | 0.25 | 0.16 | 2450 | 0.06 | 0.09 | 2300 | 8 | 1700 | 4.5 | 29 | SB |
| 21 | 115 | 0.3300 | −450 | 5 | 2900 | 0.25 | 0.16 | 2450 | 0.06 | 0.09 | 2300 | 8 | 1700 | 4.5 | 29 | SB |
| 22 | 115 | 0.3300 | −450 | 5 | 2900 | 0.25 | 0.16 | 2300 | 0.06 | 0.09 | 2200 | 8 | 1700 | 4.5 | 29 | SB |
| 23 | 115 | 0.3300 | −450 | 5 | 2900 | 0.25 | 0.16 | 2300 | 0.06 | 0.09 | 2100 | 8 | 1700 | 4.5 | 29 | SB |
| 24 | 115 | 0.3300 | −450 | 5 | 2900 | 0.25 | 0.16 | 2200 | 0.05 | 0.08 | 2500 | 8 | 1700 | 4.5 | 29 | SB |
| 25 | 115 | 0.3300 | −450 | 5 | 3000 | 0.25 | 0.14 | 2400 | 0.06 | 0.09 | 1800 | 4.5 | NA | NA | 29 | SB |

NA means not applicable.
SB means small bubbles are present in the lenses.

TABLE 2

| Run | Mold Temp. | Quantity (cin) | Back Pressure | Screw Speed | Injection Stage 1 Pressure | Injection Stage 1 Speed | Injection Stage 1 Volume | Injection Stage 2 Pressure | Injection Stage 2 Speed | Injection Stage 2 Volume | Holding Stage 1 Pressure | Holding Stage 1 Time | Holding Stage 2 Pressure | Holding Stage 2 Time | Cure Time | Performance |
|---|---|---|---|---|---|---|---|---|---|---|---|---|---|---|---|---|
| 1 | 150 | 0.2925 | 100 | 25 | 2000 | 0.2 | 0.18 | 1500 | 0.04 | 0.09 | 1000 | 8 | 800 | 4.5 | 100 | IF |
| 2 | 150 | 0.2925 | −25 | 25 | 2500 | 0.2 | 0.18 | 2000 | 0.04 | 0.09 | 2000 | 8 | 1500 | 4.5 | 100 | IF |
| 3 | 150 | 0.2975 | −25 | 25 | 3000 | 0.2 | 0.18 | 2000 | 0.04 | 0.09 | 2000 | 8 | 1500 | 4.5 | 100 | IF |
| 4 | 150 | 0.3050 | −50 | 30 | 3250 | 0.2 | 0.18 | 2500 | 0.04 | 0.09 | 2500 | 8 | 1750 | 4.5 | 60 | IF |
| 5 | 150 | 0.3050 | −100 | 30 | 3250 | 0.2 | 0.18 | 2500 | 0.04 | 0.09 | 2500 | 8 | 1750 | 4.5 | 60 | B |
| 6 | 150 | 0.3050 | −100 | 30 | 3500 | 0.2 | 0.18 | 2500 | 0.04 | 0.09 | 2500 | 8 | 1750 | 4.5 | 50 | B |
| 7 | 150 | 0.3050 | −100 | 30 | 3500 | 0.2 | 0.18 | 2500 | 0.04 | 0.09 | 2500 | 8 | 1750 | 4.5 | 50 | B |
| 8 | 150 | 0.3050 | −100 | 30 | 3500 | 0.2 | 0.18 | 2500 | 0.04 | 0.09 | 2500 | 8 | 1750 | 4.5 | 45 | B |
| 9 | 150 | 0.3050 | −100 | 30 | 3500 | 0.2 | 0.18 | 2500 | 0.04 | 0.09 | 2500 | 8 | 1750 | 4.5 | 37.5 | B |
| 10 | 150 | 0.3050 | −100 | 30 | 3500 | 0.2 | 0.18 | 2500 | 0.04 | 0.09 | 2500 | 8 | 1750 | 4.5 | 37.5 | B |
| 11 | 150 | 0.3050 | −100 | 30 | 3250 | 0.2 | 0.18 | 2500 | 0.04 | 0.09 | 2500 | 8 | 1750 | 4.5 | 35 | B |
| 12 | 150 | 0.3050 | −100 | 30 | 3250 | 0.2 | 0.18 | 2500 | 0.04 | 0.09 | 2500 | 8 | 1750 | 4.5 | 32.5 | B |
| 13 | 150 | 0.3050 | −100 | 30 | 3100 | 0.2 | 0.18 | 2750 | 0.04 | 0.09 | 2450 | 8 | 1750 | 4.5 | 30 | G |
| 14 | 150 | 0.3050 | −100 | 30 | 2900 | 0.2 | 0.18 | 2400 | 0.04 | 0.09 | 2450 | 8 | 1750 | 4.5 | 29 | G |
| 15 | 150 | 0.3050 | −100 | 30 | 2900 | 0.2 | 0.18 | 2400 | 0.04 | 0.09 | 2450 | 8 | 1750 | 4.5 | 28 | G |
| 16 | 150 | 0.3050 | −150 | 30 | 2900 | 0.2 | 0.18 | 2350 | 0.04 | 0.09 | 2850 | 8 | 1700 | 4.5 | 27 | G |
| 17 | 150 | 0.3050 | −150 | 30 | 2900 | 0.2 | 0.18 | 2350 | 0.04 | 0.09 | 2700 | 8 | 2300 | 4.5 | 28 | G |
| 18 | 150 | 0.2975 | −150 | 30 | 2900 | 0.2 | 0.18 | 2350 | 0.04 | 0.09 | 2700 | 8 | 2300 | 4.5 | 28 | G |

IF means the mold did not fill completely (incomplete fill).
B means bubbles are present in the lenses.
G means good lenses are fabricated.

TABLE 3

| Run | Mold Temp | Quantity (cin) | Back Pressure | Screw Speed | Injection Stage 1 Pressure | Injection Stage 1 Speed | Injection Stage 1 Vol. | Injection Stage 2 Pressure | Injection Stage 2 Speed | Injection Stage 2 Volume | Holding Stage 1 Pressure | Holding Stage 1 Time | Holding Stage 2 Pressure | Holding Stage 2 Time | Cure Time | Performance |
|---|---|---|---|---|---|---|---|---|---|---|---|---|---|---|---|---|
| 1 | 150 | 0.3700 | −2000 | 75 | 4000 | 0.6 | 0.4 | 2800 | 0.1 | 0.09 | 2700 | 8 | 1700 | 4.5 | 300 | A/H |
| 2 | 150 | 0.4045 | −2000 | 75 | 4000 | 0.6 | 0.4 | 2800 | 0.1 | 0.09 | 2700 | 8 | 1700 | 4.5 | 300 | A/H |
| 3 | 150 | 0.4045 | −2000 | 75 | 4000 | 0.6 | 0.4 | 2800 | 0.1 | 0.09 | 2700 | 8 | 1700 | 4.5 | 300 | A/H |
| 4 | 150 | 0.4045 | −2000 | 75 | 4000 | 0.6 | 0.4 | 2800 | 0.1 | 0.09 | 2700 | 8 | 1700 | 4.5 | 300 | A/H |
| 5 | 150 | 0.4045 | −2000 | 75 | 4000 | 0.6 | 0.4 | 2800 | 0.1 | 0.09 | 2700 | 8 | 1700 | 4.5 | 300 | A/H |
| 6 | 150 | 0.4045 | −2000 | 75 | 4000 | 0.6 | 0.4 | 2800 | 0.1 | 0.09 | 2700 | 8 | 1700 | 4.5 | 300 | A/H |
| 7 | 150 | 0.4185 | −2000 | 75 | 4000 | 0.6 | 0.4 | 2800 | 0.1 | 0.09 | 2700 | 8 | 1700 | 4.5 | 300 | A/H |
| 8 | 150 | 0.3950 | −2000 | 75 | 4000 | 0.6 | 0.4 | 2800 | 0.1 | 0.09 | 2700 | 8 | 1700 | 4.5 | 300 | clear |
| 9 | 150 | 0.3950 | −2000 | 75 | 4000 | 0.6 | 0.4 | 2800 | 0.1 | 0.09 | 2700 | 8 | 1700 | 4.5 | 300 | SB |
| 10 | 150 | 0.3950 | −2000 | 75 | 4000 | 0.6 | 0.4 | 2800 | 0.1 | 0.09 | 2700 | 8 | 1700 | 4.5 | 250 | SB |
| 11 | 150 | 0.3950 | −2000 | 75 | 4000 | 0.6 | 0.4 | 2800 | 0.1 | 0.09 | 2700 | 8 | 1700 | 4.5 | 225 | SB |
| 12 | 150 | 0.3950 | −2000 | 75 | 4000 | 0.6 | 0.4 | 2800 | 0.1 | 0.09 | 2700 | 8 | 1700 | 4.5 | 225 | SB |
| 13 | 150 | 0.3950 | −2000 | 75 | 4000 | 0.6 | 0.4 | 2800 | 0.1 | 0.09 | 2700 | 8 | 1700 | 4.5 | 200 | SB |
| 14 | 150 | 0.3900 | −2000 | 75 | 4000 | 0.6 | 0.4 | 2800 | 0.1 | 0.09 | 2700 | 8 | 1700 | 4.5 | 175 | G |
| 15 | 150 | 0.3850 | −2000 | 75 | 4000 | 0.6 | 0.4 | 2800 | 0.1 | 0.09 | 2700 | 8 | 1700 | 4.5 | 150 | G |
| 16 | 150 | 0.3850 | −2000 | 75 | 4000 | 0.6 | 0.4 | 2800 | 0.1 | 0.09 | 2700 | 8 | 1700 | 4.5 | 125 | G |
| 17 | 150 | 0.3800 | −2000 | 75 | 4000 | 0.6 | 0.4 | 2800 | 0.1 | 0.09 | 2700 | 8 | 1700 | 4.5 | 100 | VG |
| 18 | 150 | 0.3800 | −2000 | 75 | 4000 | 0.6 | 0.4 | 2800 | 0.1 | 0.09 | 2700 | 8 | 1700 | 4.5 | 75 | VG |
| 19 | 150 | 0.3800 | −2000 | 75 | 4000 | 0.6 | 0.4 | 2800 | 0.1 | 0.09 | 2700 | 8 | 1700 | 4.5 | 50 | VG |
| 20 | 150 | 0.3800 | −2000 | 75 | 4000 | 0.6 | 0.4 | 2800 | 0.1 | 0.09 | 2700 | 8 | 1700 | 4.5 | 40 | VG |
| 21 | 150 | 0.3800 | −2000 | 75 | 4000 | 0.6 | 0.4 | 2800 | 0.1 | 0.09 | 2700 | 8 | 1700 | 4.5 | 30 | VG |
| 22 | 150 | 0.3800 | −2000 | 75 | 4000 | 0.6 | 0.4 | 2800 | 0.1 | 0.09 | 2700 | 8 | 1700 | 4.5 | 20 | VG |
| 23 | 150 | 0.3800 | −2000 | 75 | 4000 | 0.6 | 0.4 | 2800 | 0.1 | 0.09 | 2700 | 8 | 1700 | 4.5 | 25 | VG |

A/H means the lenses contain air and haze.
G means good lenses form.
VG means very good lenses form.

TABLE 4

| Run | Mold Temp. | Quantity (cin) | Back Press. | Screw Speed | Injection Stage 1 Press. | Injection Stage 1 Speed | Injection Stage 1 Vol. | Injection Stage 2 Press. | Injection Stage 2 Speed | Injection Stage 2 Vol. | Holding Stage 1 Press. | Holding Stage 1 Time | Holding Stage 2 Press. | Holding Stage 2 Time | Cure Time | Cure Press. | Performance |
|---|---|---|---|---|---|---|---|---|---|---|---|---|---|---|---|---|---|
| 1 | 150 | 0.3800 | 40 | 150 | 4000 | 0.6 | 0.14 | 2800 | 0.1 | 0.09 | 2700 | 8 | 1700 | 4.5 | 75 | −2000 | Uncured |
| 2 | 150 | 0.3800 | 120 | 150 | 4000 | 0.6 | 0.14 | 2800 | 0.1 | 0.09 | 2700 | 8 | 1700 | 4.5 | 75 | −2000 | LB |
| 3 | 150 | 0.3800 | 90 | 150 | 4000 | 0.6 | 0.14 | 2800 | 0.1 | 0.09 | 2700 | 8 | 1700 | 4.5 | 75 | −2000 | Fragile |
| 4 | 150 | 0.3800 | 70 | 150 | 4000 | 0.6 | 0.14 | 2800 | 0.1 | 0.09 | 2700 | 8 | 1700 | 4.5 | 75 | −2000 | Fragile |
| 5 | 150 | 0.3800 | 60 | 150 | 3000 | 0.3 | 0.14 | 2000 | 0.06 | 0.09 | 2700 | 8 | 1700 | 4.5 | 75 | −2000 | Fragile |
| 6 | 150 | 0.3800 | 60 | 150 | 3000 | 1.0 | 0.14 | 2000 | 0.06 | 0.08 | 1900 | 0.8 | 1700 | 4.5 | 75 | −2000 | SB |
| 7 | 150 | 0.3800 | 50 | 150 | 3000 | 2.0 | 0.14 | 2000 | 0.4 | 0.08 | 1900 | 0.8 | 1700 | 4.5 | 75 | −2000 | Uncured |
| 8 | 150 | 0.3800 | 65 | 150 | 3000 | 2.0 | 0.2 | 2000 | 0.3 | 0.1 | 1900 | 0.8 | 1700 | 4.5 | 75 | −2000 | Uncured |
| 9 | 150 | 0.3800 | 70 | 150 | 4500 | 3.0 | 0.2 | 2500 | 0.5 | 0.1 | 1900 | 0.8 | 1700 | 4.5 | 75 | −2000 | Uncured |
| 10 | 150 | 0.3800 | 70 | 150 | 3500 | 0.8 | 0.16 | 2500 | 0.2 | 0.09 | 1900 | 0.8 | 1700 | 4.5 | 75 | −2000 | LB |
| 11 | 150 | 0.3800 | 70 | 150 | 4000 | 0.6 | 0.14 | 2800 | 0.1 | 0.09 | 1900 | 0.8 | 1700 | 4.5 | 75 | −2000 | LB |

LB means large bubbles form in the lenses.

TABLE 5

| Run | Mold Temp. | Quantity (cin) | Back Pressure | Screw Speed | Injection Stage 1 Pressure | Injection Stage 1 Speed | Injection Stage 1 Volume | Injection Stage 2 Pressure | Injection Stage 2 Speed | Injection Stage 2 Volume | Holding Stage 1 Pressure | Holding Stage 1 Time | Holding Stage 2 Pressure | Holding Stage 2 Time | Cure Time | Performance |
|---|---|---|---|---|---|---|---|---|---|---|---|---|---|---|---|---|
| 1 | 150 | 0.3300 | −500 | 35 | 3450 | 0.6 | 0.16 | 2500 | 0.1 | 0.09 | 2200 | 8 | 1500 | 4.5 | 120 | SB |
| 2 | 150 | 0.3300 | −500 | 35 | 3450 | 0.6 | 0.16 | 2500 | 0.1 | 0.09 | 2200 | 8 | 1500 | 4.5 | 120 | SB |
| 3 | 150 | 0.3300 | −500 | 35 | 3450 | 0.6 | 0.16 | 2500 | 0.1 | 0.09 | 2200 | 8 | 1500 | 4.5 | 120 | SB |
| 4 | 150 | 0.3400 | −500 | 35 | 3450 | 0.6 | 0.16 | 2500 | 0.1 | 0.09 | 2200 | 8 | 1500 | 4.5 | 120 | SB |
| 5 | 150 | 0.3400 | −500 | 35 | 3450 | 0.6 | 0.16 | 2500 | 0.1 | 0.09 | 2100 | 8 | 1500 | 4.5 | 120 | VG |
| 6 | 150 | 0.3400 | −500 | 30 | 3450 | 0.6 | 0.16 | 2500 | 0.1 | 0.09 | 2000 | 8 | 1500 | 4.5 | 100 | VG |
| 7 | 150 | 0.3400 | −500 | 30 | 3450 | 0.6 | 0.16 | 2500 | 0.1 | 0.09 | 1900 | 8 | 1500 | 4.5 | 95 | LB |
| 8 | 150 | 0.3400 | −500 | 25 | 3450 | 0.6 | 0.16 | 2500 | 0.1 | 0.09 | 1800 | 8 | 1500 | 4.5 | 95 | LB |
| 9 | 150 | 0.3400 | −500 | 20 | 3450 | 0.6 | 0.16 | 2500 | 0.1 | 0.09 | 1900 | 8 | 1500 | 4.5 | 90 | G |
| 10 | 150 | 0.3400 | −500 | 20 | 3450 | 0.6 | 0.16 | 2500 | 0.1 | 0.09 | 1900 | 8 | 1500 | 4.5 | 85 | G |
| 11 | 150 | 0.3375 | −500 | 20 | 3450 | 0.6 | 0.16 | 2500 | 0.1 | 0.09 | 1900 | 8 | 1500 | 4.5 | 85 | G |
| 12 | 150 | 0.3375 | −500 | 20 | 3450 | 0.6 | 0.16 | 2500 | 0.1 | 0.09 | 1900 | 8 | 1500 | 4.5 | 80 | G |
| 13 | 150 | 0.3375 | −500 | 20 | 3450 | 0.6 | 0.16 | 2500 | 0.1 | 0.09 | 1900 | 8 | 1500 | 4.5 | 75 | F |
| 14 | 150 | 0.3375 | −500 | 20 | 3450 | 0.6 | 0.16 | 2500 | 0.1 | 0.09 | 1900 | 8 | 1500 | 4.5 | 70 | F |
| 15 | 150 | 0.3375 | −500 | 20 | 3450 | 0.6 | 0.16 | 2500 | 0.1 | 0.09 | 1900 | 8 | 1500 | 4.5 | 65 | F |
| 16 | 150 | 0.3375 | −500 | 20 | 3450 | 0.6 | 0.16 | 2500 | 0.1 | 0.09 | 1900 | 8 | 1500 | 4.5 | 60 | F |
| 17 | 150 | 0.3375 | −500 | 20 | 3450 | 0.6 | 0.16 | 2500 | 0.1 | 0.09 | 1900 | 8 | 1500 | 4.5 | 70 | F |
| 18 | 150 | 0.3375 | −500 | 20 | 3450 | 0.6 | 0.16 | 2500 | 0.1 | 0.09 | 1900 | 8 | 1500 | 4.5 | 70 | F |

TABLE 6

| Run | Mold Temp. | Quantity (cin) | Back Pressure | Screw Speed | Injection Stage 1 Pressure | Injection Stage 1 Speed | Injection Stage 1 Volume | Injection Stage 2 Pressure | Injection Stage 2 Speed | Injection Stage 2 Volume | Holding Stage 1 Pressure | Holding Stage 1 Time | Holding Stage 2 Pressure | Holding Stage 2 Time | Cure Time | Performance |
|---|---|---|---|---|---|---|---|---|---|---|---|---|---|---|---|---|
| 1 | 150 | 0.330 | −500 | 35 | 3450 | 0.6 | 0.16 | 2500 | 0.1 | 0.09 | 1950 | 8 | 1500 | 4.5 | 50 | G |
| 2 | 150 | 0.330 | −500 | 35 | 3450 | 0.6 | 0.16 | 2500 | 0.1 | 0.09 | 1950 | 8 | 1500 | 4.5 | 45 | G |
| 3 | 150 | 0.350 | −500 | 35 | 3450 | 0.6 | 0.16 | 2500 | 0.1 | 0.09 | 1950 | 8 | 1500 | 4.5 | 45 | G |
| 4 | 150 | 0.350 | −500 | 35 | 3450 | 0.6 | 0.16 | 2500 | 0.1 | 0.09 | 1950 | 8 | 1500 | 4.5 | 40 | G |
| 5 | 150 | 0.360 | −250 | 25 | 3450 | 0.6 | 0.16 | 2500 | 0.1 | 0.09 | 1950 | 8 | 1500 | 4.5 | 40 | G |
| 6 | 150 | 0.360 | −250 | 25 | 3200 | 0.6 | 0.16 | 2500 | 0.1 | 0.09 | 1950 | 8 | 1500 | 4.5 | 40 | G |
| 7 | 150 | 0.360 | −250 | 25 | 3200 | 0.6 | 0.16 | 2500 | 0.1 | 0.09 | 1950 | 8 | 1500 | 4.5 | 35 | G |
| 8 | 150 | 0.360 | −250 | 25 | 3200 | 0.6 | 0.16 | 2500 | 0.1 | 0.09 | 1950 | 8 | 1500 | 4.5 | 35 | G |
| 9 | 150 | 0.360 | −150 | 25 | 3200 | 0.6 | 0.16 | 2500 | 0.1 | 0.09 | 1950 | 8 | 1500 | 4.5 | 35 | G |
| 10 | 150 | 0.360 | −150 | 25 | 3200 | 0.6 | 0.16 | 2500 | 0.1 | 0.09 | 1950 | 8 | 1500 | 4.5 | 30 | G |
| 11 | 150 | 0.360 | −150 | 25 | 3200 | 0.6 | 0.16 | 2500 | 0.1 | 0.09 | 1950 | 8 | 1500 | 4.5 | 30 | G |
| 12 | 150 | 0.360 | −150 | 25 | 3000 | 0.6 | 0.16 | 2500 | 0.1 | 0.09 | 1950 | 8 | 1500 | 4.5 | 30 | G |

TABLE 7

| Run | Mold Temp. | Quantity (cin) | Back Pressure | Screw Speed | Injection Stage 1 Pressure | Injection Stage 1 Speed | Injection Stage 1 Volume | Injection Stage 2 Pressure | Injection Stage 2 Speed | Injection Stage 2 Volume | Holding Stage 1 Pressure | Holding Stage 1 Time | Holding Stage 2 Pressure | Holding Stage 2 Time | Cure Time | Performance |
|---|---|---|---|---|---|---|---|---|---|---|---|---|---|---|---|---|
| 1 | 150 | 0.330 | −150 | 25 | 2900 | 0.6 | 0.16 | 2100 | 0.1 | 0.09 | 1950 | 8 | 1800 | 0.5 | 50 | G |
| 2 | 150 | 0.330 | −150 | 25 | 2900 | 0.6 | 0.16 | 2100 | 0.1 | 0.09 | 1950 | 8 | 1800 | 0.5 | 50 | G |
| 3 | 150 | 0.330 | −150 | 25 | 2900 | 0.6 | 0.16 | 2100 | 0.1 | 0.09 | 1950 | 8 | 1800 | 0.5 | 45 | G |
| 4 | 150 | 0.340 | −150 | 25 | 2900 | 0.6 | 0.16 | 2100 | 0.1 | 0.09 | 1950 | 8 | 1800 | 0.5 | 45 | G |
| 5 | 150 | 0.340 | −150 | 25 | 2900 | 0.6 | 0.16 | 2100 | 0.1 | 0.09 | 1950 | 8 | 1800 | 0.5 | 40 | G |
| 6 | 150 | 0.340 | −150 | 25 | 2900 | 0.6 | 0.16 | 2100 | 0.1 | 0.09 | 1950 | 8 | 1800 | 0.5 | 40 | G |
| 7 | 150 | 0.340 | −150 | 25 | 2900 | 0.6 | 0.16 | 2100 | 0.1 | 0.09 | 1950 | 8 | 1800 | 0.5 | 40 | G |
| 8 | 150 | 0.340 | −150 | 25 | 2900 | 0.6 | 0.16 | 2100 | 0.1 | 0.09 | 1950 | 8 | 1800 | 0.5 | 35 | G |
| 9 | 150 | 0.340 | −150 | 25 | 2900 | 0.6 | 0.16 | 2100 | 0.1 | 0.09 | 1950 | 8 | 1800 | 0.5 | 35 | G |
| 10 | 150 | 0.340 | −150 | 25 | 2900 | 0.6 | 0.16 | 2200 | 0.1 | 0.09 | 1950 | 8 | 1800 | 0.5 | 30 | G |
| 11 | 150 | 0.340 | −150 | 25 | 3000 | 0.6 | 0.16 | 2300 | 0.1 | 0.09 | 2000 | 8 | 1800 | 0.5 | 30 | G |
| 12 | 150 | 0.340 | −150 | 25 | 3000 | 0.6 | 0.16 | 2300 | 0.1 | 0.09 | 2000 | 8 | 1800 | 0.5 | 30 | G |
| 13 | 150 | 0.340 | −150 | 25 | 3000 | 0.6 | 0.16 | 2300 | 0.1 | 0.09 | 2100 | 8 | 1800 | 0.5 | 25 | G |
| 14 | 150 | 0.340 | −150 | 25 | 3000 | 0.6 | 0.16 | 2300 | 0.1 | 0.09 | 2100 | 8 | 1800 | 0.5 | 25 | G |
| 15 | 150 | 0.340 | −150 | 25 | 3000 | 0.6 | 0.16 | 2300 | 0.1 | 0.09 | 2100 | 8 | 1800 | 0.5 | 25 | G |
| 16 | 150 | 0.340 | −150 | 25 | 3000 | 0.6 | 0.16 | 2300 | 0.1 | 0.09 | 2100 | 8 | 1800 | 0.5 | 25 | G |

TABLE 8

| Run | Mold Temp | Quantity (cin) | Back Pressure | Screw Speed | Injection Stage 1 Pressure | Injection Stage 1 Speed | Injection Stage 1 Vol. | Holding Stage 1 Pressure | Holding Stage 1 Time | Holding Stage 2 Pressure | Holding Stage 2 Time | Cure Time | Perform |
|---|---|---|---|---|---|---|---|---|---|---|---|---|---|
| 1 | 150 | 0.05 | −500 | 30 | 4000 | 0.6 | 0.04 | 2700 | 0.8 | 1700 | 0.45 | 50 | Air bubbles |
| 2 | 150 | 0.07 | −500 | 30 | 2800 | 0.18 | 0.02 | 2700 | 0.8 | 1700 | 0.45 | 70 | Brittle Lenses |
| 3 | 150 | 0.09 | −500 | 30 | 2800 | 0.18 | 0.02 | 2700 | 0.8 | 1700 | 0.45 | 60 | Brittle Lenses |
| 4 | 150 | 0.09 | −500 | 30 | 2800 | 0.18 | 0.02 | 2700 | 0.8 | 1700 | 0.45 | 60 | Brittle Lenses |
| 5 | 150 | 0.09 | −500 | 30 | 2800 | 0.18 | 0.02 | 2700 | 0.8 | 1700 | 0.45 | 60 | Brittle Lenses |
| 6 | 150 | 0.09 | −500 | 30 | 2800 | 0.18 | 0.02 | 2700 | 0.8 | 1700 | 0.45 | 60 | Brittle Lenses |
| 7 | 150 | 0.09 | −500 | 30 | 2800 | 0.18 | 0.02 | 2700 | 0.8 | 1700 | 0.45 | 60 | Brittle Lenses |
| 8 | 150 | 0.09 | −500 | 30 | 2800 | 0.18 | 0.02 | 2700 | 0.8 | 1700 | 0.45 | 60 | Brittle Lenses |
| 9 | 150 | 0.09 | −500 | 30 | 2800 | 0.18 | 0.02 | 2700 | 0.8 | 1700 | 0.45 | 45 | Brittle Lenses |
| 10 | 150 | 0.09 | −500 | 30 | 2800 | 0.18 | 0.02 | 2700 | 0.8 | 1700 | 0.45 | 45 | Brittle Lenses |
| 11 | 150 | 0.09 | −500 | 30 | 2800 | 0.18 | 0.02 | 2700 | 0.8 | 1700 | 0.45 | 45 | Brittle Lenses |
| 12 | 150 | 0.09 | −500 | 30 | 2800 | 0.18 | 0.02 | 2700 | 0.8 | 1700 | 0.45 | 45 | Brittle Lenses |
| 13 | 150 | 0.09 | −100 | 30 | 2800 | 0.18 | 0.02 | 2700 | 0.8 | 1700 | 0.45 | 45 | Brittle Lenses |
| 14 | 150 | 0.09 | −100 | 30 | 2800 | 0.18 | 0.02 | 2700 | 0.8 | 1700 | 0.45 | 45 | Brittle Lenses |
| 15 | 150 | 0.09 | −100 | 30 | 2800 | 0.18 | 0.02 | 2700 | 0.8 | 1700 | 0.45 | 45 | Brittle Lenses |

TABLE 9

| Run | Mold Temp | Quantity (cin) | Back Press. | Screw Speed | Injection Stage 1 Press. | Injection Stage 1 Speed | Injection Stage 1 Vol. | Injection Stage 2 Press. | Injection Stage 2 Speed | Injection Stage 2 Vol. | Holding Stage 1 Press. | Holding Stage 1 Time | Holding Stage 2 Press. | Holding Stage 2 Time | Cure Time | Perform |
|---|---|---|---|---|---|---|---|---|---|---|---|---|---|---|---|---|
| 1 | 150 | 0.090 | −100 | 30 | 3000 | 0.3 | 0.04 | 2000 | 0.1 | 0.02 | 1900 | 8 | 1500 | 4.5 | 45 | IF |
| 2 | 150 | 0.090 | −100 | 30 | 3000 | 0.3 | 0.04 | 2000 | 0.1 | 0.02 | 1900 | 8 | 1500 | 4.5 | 45 | IF |
| 3 | 150 | 0.090 | −100 | 10 | 3000 | 0.3 | 0.04 | 2000 | 0.1 | 0.02 | 1900 | 8 | 1500 | 4.5 | 45 | Refill long |
| 4 | 150 | 0.090 | −100 | 15 | 3000 | 0.3 | 0.04 | 2000 | 0.1 | 0.02 | 1900 | 8 | 1500 | 4.5 | 45 | |
| 5 | 150 | 0.090 | −75 | 15 | 2500 | 0.2 | 0.05 | 1700 | 0.08 | 0.03 | 1600 | 8 | 1000 | 4.5 | 45 | |

TABLE 9-continued

| Run | Mold Temp | Quantity (cin) | Back Press. | Screw Speed | Injection Stage 1 Press. | Injection Stage 1 Speed | Injection Stage 1 Vol. | Injection Stage 2 Press. | Injection Stage 2 Speed | Injection Stage 2 Vol. | Holding Stage 1 Press. | Holding Stage 1 Time | Holding Stage 2 Press. | Holding Stage 2 Time | Cure Time | Perform |
|---|---|---|---|---|---|---|---|---|---|---|---|---|---|---|---|---|
| 6 | 150 | 0.090 | −50 | 15 | 2500 | 0.2 | 0.045 | 1800 | 0.08 | 0.025 | 1750 | 8 | 1300 | 4.5 | 45 | Better |
| 7 | 150 | 0.095 | −50 | 15 | 2300 | 0.18 | 0.045 | 1800 | 0.08 | 0.025 | 1750 | 8 | 1300 | 4.5 | 45 | Better |
| 8 | 150 | 0.100 | −25 | 15 | 2200 | 0.16 | 0.045 | 1700 | 0.07 | 0.025 | 1675 | 8 | 1300 | 4.5 | 45 | Better |
| 9 | 150 | 0.100 | −25 | 14 | 2100 | 0.15 | 0.045 | 1650 | 0.06 | 0.025 | 1625 | 8 | 1300 | 4.5 | 45 | IF |
| 10 | 150 | 0.105 | −25 | 14 | 2100 | 0.15 | 0.045 | 1650 | 0.06 | 0.025 | 1625 | 8 | 1300 | 4.5 | 45 | Air |
| 11 | 150 | 0.105 | −25 | 13 | 2000 | 0.14 | 0.045 | 1650 | 0.06 | 0.025 | 1625 | 8 | 1300 | 4.5 | 45 | Air |
| 12 | 150 | 0.105 | −25 | 13 | 2100 | 0.14 | 0.05 | 1650 | 0.07 | 0.033 | 1625 | 8 | 1300 | 4.5 | 45 | |
| 13 | 150 | 0.105 | −25 | 13 | 2100 | 0.14 | 0.05 | 1650 | 0.07 | 0.033 | 1625 | 8 | 1300 | 4.5 | 45 | Best |
| 14 | 150 | 0.105 | −25 | 13 | 2100 | 0.14 | 0.05 | 1625 | 0.07 | 0.023 | 1625 | 8 | 1300 | 4.5 | 45 | Air |
| 15 | 150 | 0.105 | −25 | 13 | 2100 | 0.14 | 0.052 | 1650 | 0.07 | 0.023 | 1625 | 8 | 1300 | 4.5 | 42 | Air |

TABLE 10

| Run | Mold Temp | Quantity (cin) | Back Press. | Screw Speed | Injection Stage 1 Press. | Injection Stage 1 Speed | Injection Stage 1 Vol. | Injection Stage 2 Press. | Injection Stage 2 Speed | Injection Stage 2 Vol. | Holding Stage 1 Press. | Holding Stage 1 Time | Holding Stage 2 Press. | Holding Stage 2 Time | Cure Time | No. Lenses with Voids | Release | No. Lenses with Cracks |
|---|---|---|---|---|---|---|---|---|---|---|---|---|---|---|---|---|---|---|
| 1 | 150 | 0.345 | −150 | 25 | 3000 | 0.6 | 0.16 | 2500 | 0.1 | 0.09 | 2160 | 8 | 1500 | 0 | 30 | 3 | hard | 0 |
| 2 | 150 | 0.345 | −150 | 25 | 3000 | 0.6 | 0.16 | 2500 | 0.1 | 0.09 | 2160 | 8 | 1500 | 0 | 30 | 2 | hard | 1 |
| 3 | 150 | 0.345 | −150 | 25 | 3000 | 0.6 | 0.16 | 2500 | 0.1 | 0.09 | 2160 | 8 | 1500 | 0 | 30 | 2 | hard | 1 |
| 4 | 150 | 0.345 | −150 | 25 | 3000 | 0.6 | 0.16 | 2500 | 0.1 | 0.09 | 2160 | 8 | 1500 | 0 | 30 | 1 | hard | 2 |
| 5 | 150 | 0.345 | −150 | 25 | 3000 | 0.6 | 0.16 | 2500 | 0.1 | 0.09 | 2160 | 8 | 1500 | 0 | 30 | 1 | hard | 2 |
| 6 | 150 | 0.345 | −150 | 25 | 3000 | 0.6 | 0.16 | 2500 | 0.1 | 0.09 | 2160 | 8 | 1500 | 0 | 30 | 0 | hard | 3 |
| 7 | 150 | 0.345 | −150 | 25 | 3000 | 0.6 | 0.16 | 2500 | 0.1 | 0.09 | 2160 | 8 | 1500 | 0 | 30 | 2 | hard | 2 |
| 8 | 150 | 0.345 | −150 | 25 | 3000 | 0.6 | 0.16 | 2500 | 0.1 | 0.09 | 2160 | 8 | 1500 | 0 | 30 | 1 | hard | 2 |
| 9 | 150 | 0.345 | −150 | 25 | 3000 | 0.6 | 0.16 | 2500 | 0.1 | 0.09 | 2160 | 8 | 1500 | 0 | 30 | 1 | hard | 2 |
| 10 | 150 | 0.345 | −150 | 25 | 3000 | 0.6 | 0.16 | 2500 | 0.1 | 0.09 | 2160 | 8 | 1500 | 0 | 30 | 3 | hard | 2 |
| 11 | 150 | 0.345 | −150 | 25 | 3000 | 0.6 | 0.16 | 2500 | 0.1 | 0.09 | 2160 | 8 | 1500 | 0 | 30 | 2 | hard | 2 |
| 12 | 150 | 0.345 | −150 | 25 | 3000 | 0.6 | 0.16 | 2500 | 0.1 | 0.09 | 2160 | 8 | 1500 | 0 | 30 | 0 | hard | 2 |
| 13 | 150 | 0.345 | −150 | 25 | 3000 | 0.6 | 0.16 | 2500 | 0.1 | 0.09 | 2160 | 8 | 1500 | 0 | 30 | 3 | hard | 3 |
| 14 | 150 | 0.345 | −150 | 25 | 3000 | 0.6 | 0.16 | 2500 | 0.1 | 0.09 | 2160 | 8 | 1500 | 0 | 30 | 3 | hard | 3 |
| 15 | 150 | 0.345 | −150 | 25 | 3000 | 0.6 | 0.16 | 2500 | 0.1 | 0.09 | 2160 | 8 | 1500 | 0 | 30 | 3 | hard | 3 |

TABLE 11

| Run | Number of Lenses with Voids | Release | Number of Lenses with Cracks |
|---|---|---|---|
| 1 | 1 | hard | 2 |
| 2 | 0 | hard | 2 |
| 3 | 1 | hard | 3 |
| 4 | 3 | hard | 3 |
| 5 | 0 | hard | 3 |
| 6 | 0 | hard | 3 |
| 7 | 1 | hard | 3 |
| 8 | 1 | hard | 3 |
| 9 | 3 | hard | 3 |
| 10 | 3 | hard | 3 |
| 11 | 3 | hard | 3 |
| 12 | 3 | hard | 3 |
| 13 | 3 | hard | 1 |
| 14 | 3 | hard | 1 |
| 15 | 3 | moderate | 3 |
| 16 | 3 | moderate | 3 |
| 17 | 3 | moderate | 2 |
| 18 | 3 | moderate | 2 |
| 19 | 3 | moderate | 1 |
| 20 | 2 | moderate | 2 |
| 21 | 2 | moderate | 1 |
| 22 | 2 | easy | 1 |
| 23 | 0 | easy | 2 |
| 24 | 0 | easy | 1 |
| 25 | 3 | easy | 1 |
| 26 | 3 | easy | 1 |
| 27 | 2 | easy | 0 |
| 28 | 0 | easy | 0 |
| 29 | 0 | easy | 0 |
| 30 | 0 | easy | 0 |

TABLE 12

| Run | Number of Lenses with Voids | Release | Number of Lenses with Cracks |
|---|---|---|---|
| 1 | 1 | fair | 1 |
| 2 | 0 | fair | 1 |
| 3 | 1 | fair | 2 |
| 4 | 2 | fair | 2 |
| 5 | 0 | fair | 2 |
| 6 | 0 | fair | 2 |
| 7 | 0 | hard | 3 |
| 8 | 0 | hard | 2 |
| 9 | 0 | hard | 3 |
| 10 | 0 | fair | 2 |
| 11 | 0 | fair | 2 |
| 12 | 0 | fair | 2 |

TABLE 13

| Run | Number of Lenses with Voids | Release | Number of Lenses with Cracks |
| --- | --- | --- | --- |
| 1 | 0 | fair | 1 |
| 2 | 0 | fair | 2 |
| 3 | 0 | fair | 3 |
| 4 | 0 | fair | 2 |
| 5 | 0 | fair | 2 |
| 6 | 0 | fair | 2 |
| 7 | 0 | fair | 2 |
| 8 | 0 | fair | 2 |
| 9 | 0 | fair | 2 |
| 10 | 0 | easy | 0 |
| 11 | 0 | easy | 0 |
| 12 | 0 | easy | 1 |
| 13 | 0 | easy | 0 |
| 14 | 0 | easy | 0 |

DRAWINGS

Figure 1:
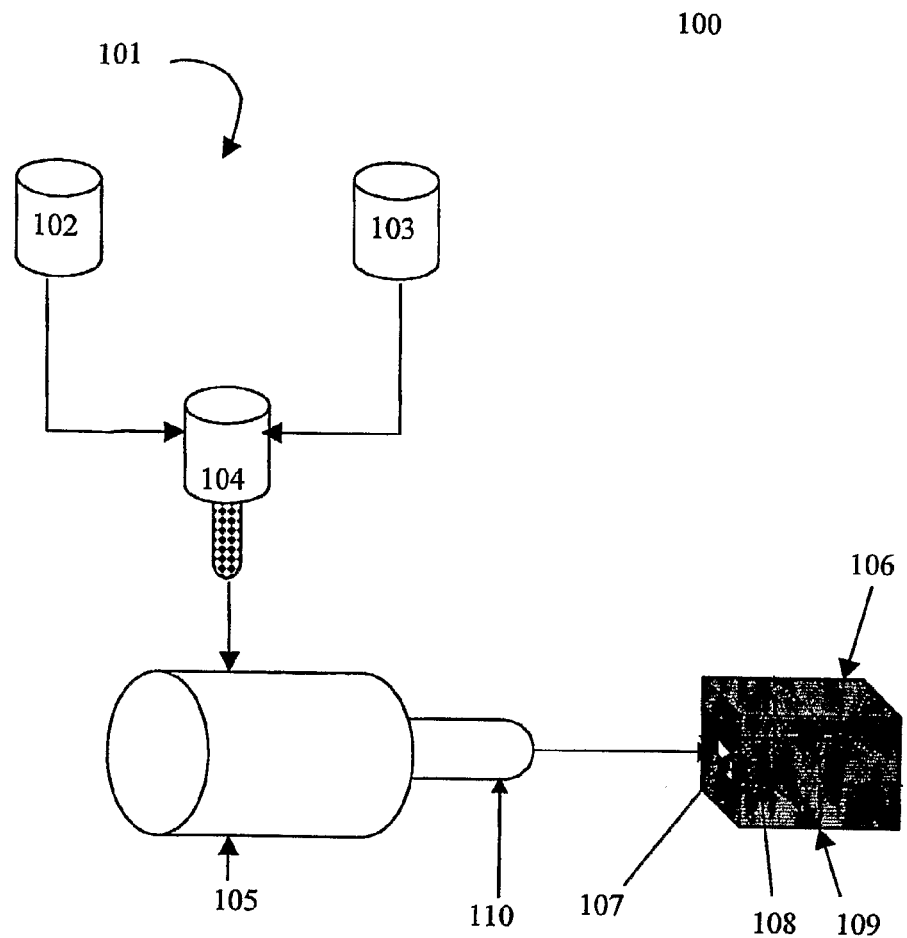
FIG. 1 is a schematic representation of liquid injection molding process equipment for use in the method of this invention.
Figure 2:
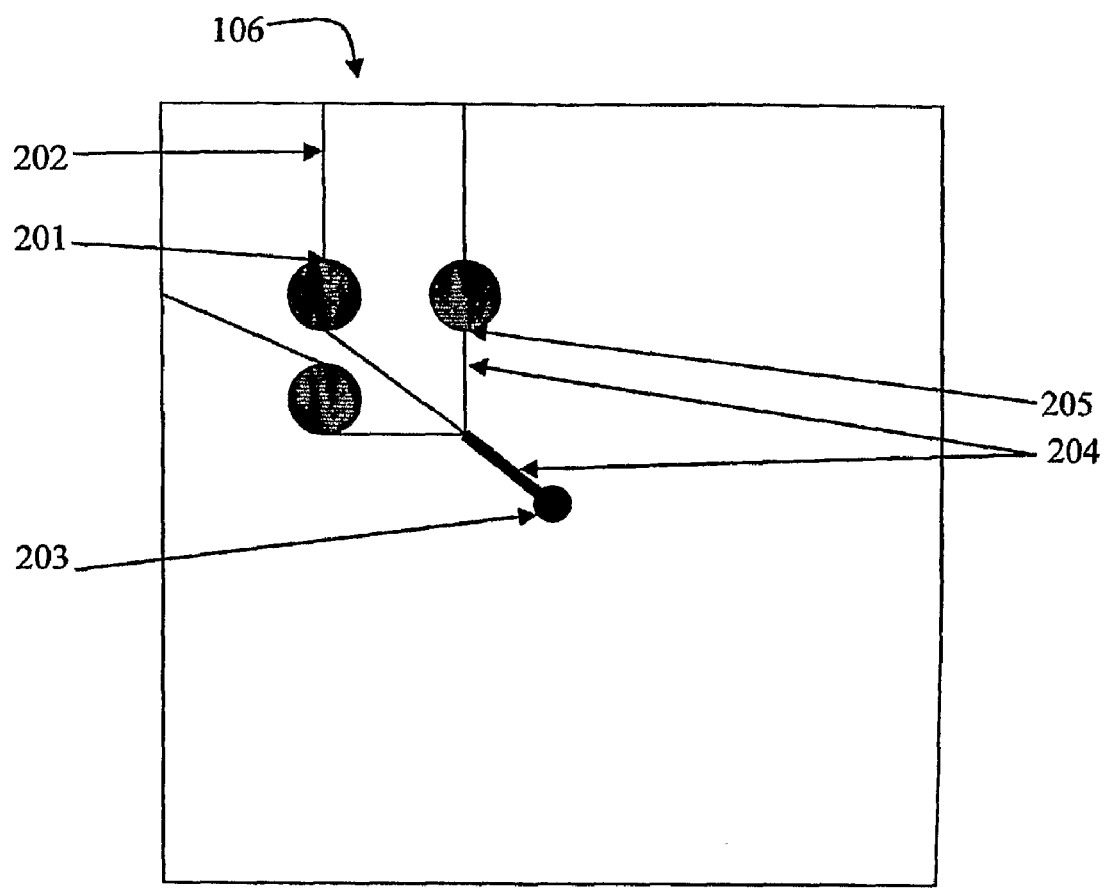
FIG. 2 is a cross sectional view of one side of a mold 106 taken along line 109 in FIG. 1.
Figure 3:
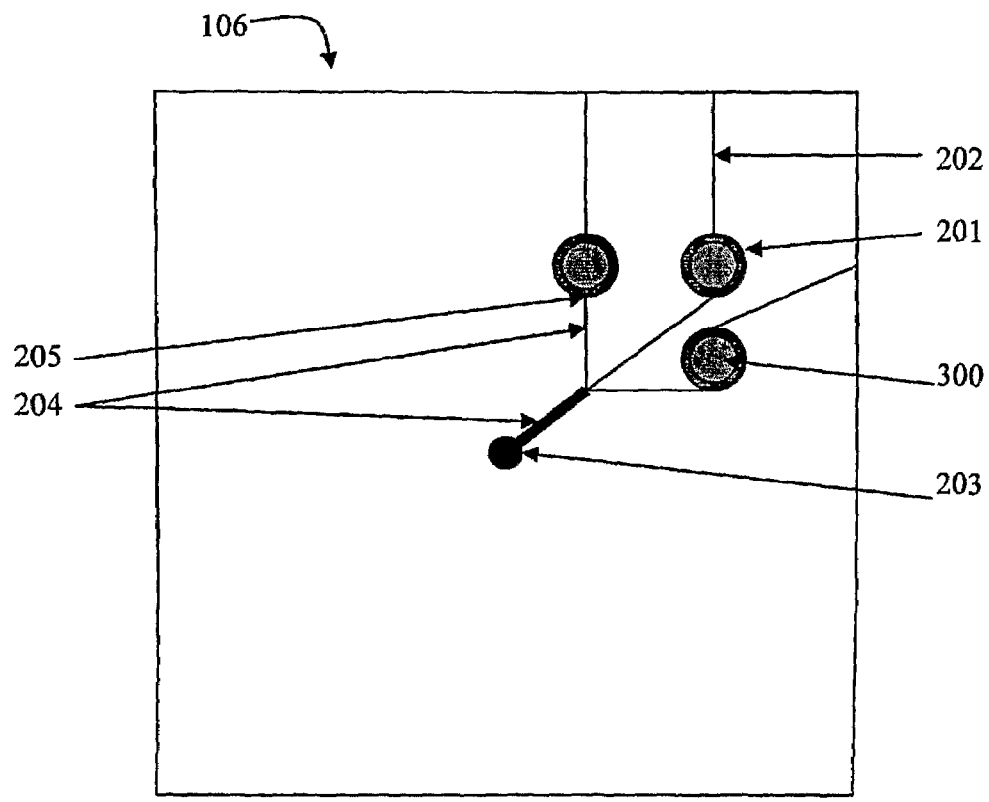
FIG. 3 is a cross sectional view of the opposing side of the mold 106 in FIG. 2.

| Reference Numerals | |
| --- | --- |
| 100 | liquid injection molding process equipment |
| 101 | feed system |
| 102 | feed tank |
| 103 | feed tank |
| 104 | static mixer |
| 105 | extruder |
| 106 | mold |
| 107 | inlet |
| 108 | horizontal cross section line |
| 109 | vertical cross section line |
| 110 | assembly |
| 201 | mold cavity |
| 202 | vent |
| 203 | sprue |
| 204 | runner |
| 205 | gate |
| 300 | button |

The invention claimed is:

1. A composition comprising:

(A) 100 parts by weight of an organopolysiloxane resin represented by average compositional formula $$R^1_a R^2_b SiO_{(4-a-b)/2} \quad (1)$$

where each $R^1$ is independently an alkenyl group having 2 to 10 carbon atoms, each $R^2$ is independently a substituted or unsubstituted monovalent hydrocarbon group other than $R^1$, with the proviso that at least 50 mole % of $R^2$ comprise phenyl groups, subscript "a" has a value ranging from 0.09 to 0.16, and subscript "b" has a value ranging from 1.00 to 1.20; with the provisos that (i) the organopolysiloxane resin comprises alkenyl groups and phenyl groups and (ii) the organopolysiloxane resin has a weight-average molecular weight equal to or exceeding 3000 with polystyrene as reference and determined by gel chromatography;

(B) 10 to 50 parts by weight of an organooligosiloxane represented by average compositional formula $$R^3_c R^4_d SiO_{(4-c-d)/2} \quad (2)$$

where each $R^3$ is independently an alkenyl group having 2 to 10 carbon atoms, each $R^4$ is independently a substituted or unsubstituted monovalent hydrocarbon group other than $R^3$, with the proviso that at least 10 mole % of $R^4$ comprise phenyl groups; subscript "c" has a value ranging from 0.60 to 0.80, and subscript "d" has a value ranging from 1.50 to 2.10; with the proviso that the organooligosiloxane comprises alkenyl groups and phenyl groups;

(C) 20 to 100 parts by weight of an organohydrogenoligosiloxane or organohydrogenpolysiloxane represented by average compositional formula $$H_e R^5_f SiO_{(4-e-f)/2} \quad (3)$$

where each $R^5$ is independently a substituted or unsubstituted monovalent or non-substituted monovalent hydrocarbon group other than alkenyl groups, with the proviso that at least 20 mole % of $R^5$ comprise phenyl groups; subscript "e" has a value ranging from 0.35 to 0.65, and subscript "f" has a value ranging from 0.90 to 1.70;

(D) a catalytic quantity of an addition-reaction catalyst; and (E) 0.2 to 2 weight % of a mold release agent; where the composition is curable to form an article having a hardness of 60 to 100 at 25° C. and 40 to 100 at 150° C. as measured by ASTM D2240-86.

2. The composition of claim 1, where component (E) has general formula: $R^9_3 SiO(R^9_2 SiO)_x(R^9 R^{10} SiO)_y SiR^9_3$, where x has a value of 0 or greater, y has a value of 1 or greater, with the proviso that x and y have values sufficient that the mold release agent has a viscosity of 100 to 3,000 cps; each $R^9$ is independently an alkyl group and each $R^{10}$ is independently an aryl group.

3. The composition of claim 1, where in average compositional formula (1), "a" has a value ranging from 0.10 to 0.15 and "b" has a value ranging from 1.00 to 1.15; in average compositional formula (2), "c" has a value ranging from 0.60 to 0.80, and "d" has a value ranging from 1.50 to 2.00; and in average compositional formula (3), "e" has a value ranging from 0.35 to 0.65, and "f" has a value ranging from 1.30 to 1.70.

4. The composition of claim 1, where component (B) is an organooligosiloxane expressed by average compositional formula:

$$(R^7 R^8_2 SiO)_g SiR^8_{(4-g)} \quad (4)$$

where each $R^7$ is independently an alkenyl group with 2 to 10 carbon atoms, each $R^8$ is independently a substituted or unsubstituted monovalent hydrocarbon group other than $R^7$, with the proviso that at least 10 mole % of $R^8$ comprise phenyl groups; and "g" is 2 or 3.

* * * * *